(12) United States Patent
Diorio et al.

(10) Patent No.: US 7,633,376 B2
(45) Date of Patent: Dec. 15, 2009

(54) REPORTING ON AUTHENTICATION OF RFID TAGS FOR INDICATING LEGITIMACY OF THEIR ASSOCIATED ITEMS

(75) Inventors: Christopher J. Diorio, Shoreline, WA (US); Gregory T. Kavounas, Kirkland, WA (US)

(73) Assignee: Impinj, Inc., Seattle, WA (US)

( * ) Notice: Subject to any disclaimer, the term of this patent is extended or adjusted under 35 U.S.C. 154(b) by 422 days.

(21) Appl. No.: 11/637,255

(22) Filed: Dec. 11, 2006

(65) Prior Publication Data

US 2007/0136583 A1 Jun. 14, 2007

Related U.S. Application Data

(60) Provisional application No. 60/749,864, filed on Dec. 12, 2005.

(51) Int. Cl.
*G05B 19/00* (2006.01)
(52) U.S. Cl. ............... 340/5.85; 340/10.1; 380/255; 713/168
(58) Field of Classification Search ............ 340/5.2, 340/5.21, 5.28, 5.6, 5.8, 5.85, 10.1, 10.5; 713/168; 380/255
See application file for complete search history.

(56) References Cited

U.S. PATENT DOCUMENTS

| | | | |
|---|---|---|---|
| 6,967,577 B2 * | 11/2005 | Taylor et al. | 340/572.1 |
| 7,137,000 B2 | 11/2006 | Hohberger et al. | |
| 2006/0054682 A1 * | 3/2006 | de la Huerga | 235/375 |
| 2007/0199988 A1 | 8/2007 | Labgold | |

OTHER PUBLICATIONS (A) EPCglobal Inc. "Specification for RFID Air Interface—EPC Radio-Frequency Identity Protocols Class-1 Generation-2 UHF RFID Protocol for Communications at 860 MHz-960 MHz, Version 1.1.0." (a.k.a. "The Gen 2 Spec V1.1.0") EPCglobal Inc., Dec. 17, 2005. <http:\\www.epcglobalinc.org>.

(Continued)

*Primary Examiner*—Thomas J Mullen
(74) *Attorney, Agent, or Firm*—Turk IP Law, LLC

(57) ABSTRACT

RFID readers, computers, and methods are provided for reporting on the authentication of one or more RFID tags associated with a proffered item, while requiring special permissions be cleared before reporting. In some embodiments, a question is input about whether a Declared Password (DP) is regarded as proper for an Item Identifier (II), both of which have been input from the tags. An answer is generated for the question from the reference database, and transmitted to the user. The answer does not reveal an Actual Code that is indeed regarded as proper, unless the user first demonstrates they already know it. Beyond the authentication of the tag, the answer can further indicate the legitimacy of the proffered item, for a supply chain, at a Customs Office, etc.

131 Claims, 21 Drawing Sheets

RFID TAG WITH ITEM IDENTIFIER (II) AND
DECLARED PASSWORD (DP) FOR THEIR II

OTHER PUBLICATIONS (B) EPCglobal Inc. "Specification for RFID Air Interface-EPC Radio-Frequency Identity Protocols Class-1 Generation-2 UHF RFID Protocol for Communications at 860 MHz-960 MHz, Version 1.0.8." EPCglobal Inc., Dec. 14, 2004. http://www.epcglobalinc.org.
(C) Declaration of Stacy L. Jones authenticating attached Website Materials as accessed and posted at http://www.autoid.org/SC31/sc_31_wg4_sg3.htm on Sep. 1, 2006.

Juels, Ari; RFID Security and Privacy: A Research Survey; Circulated Paper; Sep. 28, 2005; pp. 1-19; RSA Laboratories; Bedford, Massachusetts.
Juels, Ari; Strengthening EPC Tags Against Cloning; Circulated Paper; Mar. 16, 2005; pp. 1-17; RSA Laboratories; Bedford, Massachusetts.
U.S. Appl. No. 11/356,885 filed Feb. 17, 2006.

* cited by examiner

RFID TAG WITH ITEM IDENTIFIER (II) AND
DECLARED PASSWORD (DP) FOR THEIR II

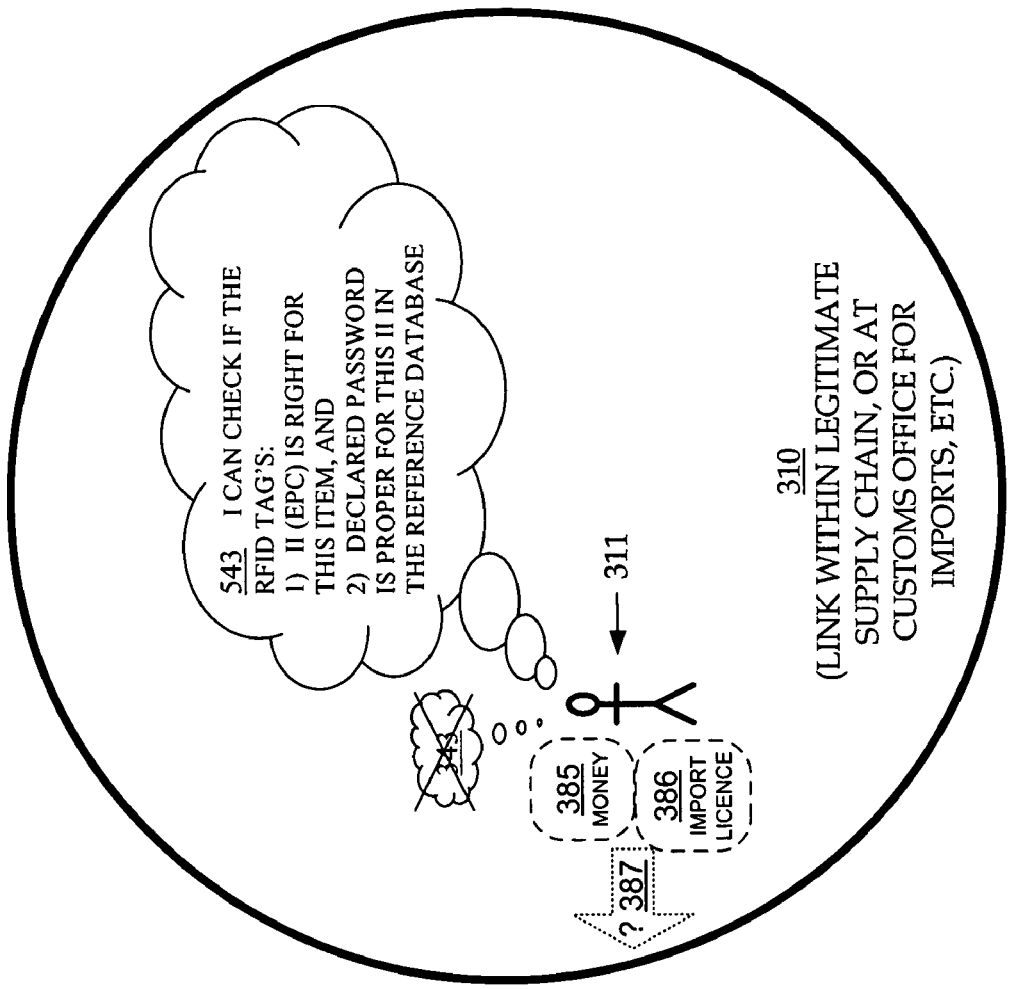
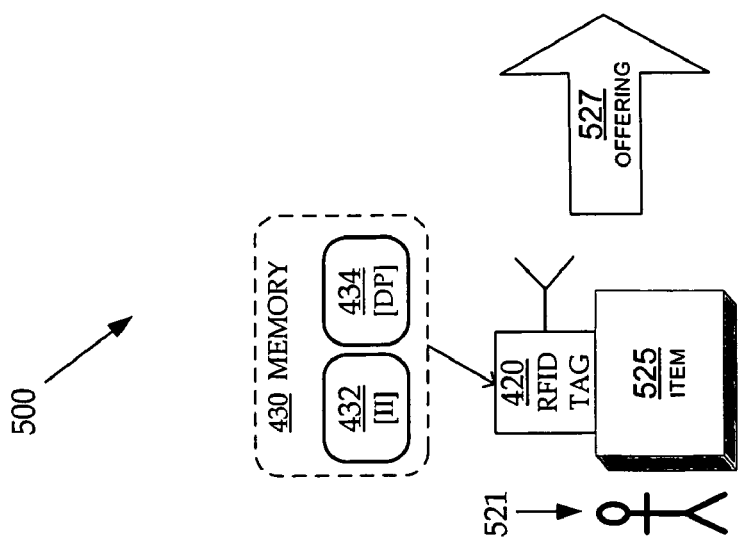
FIG. 5

HANDLING ITEMS IN SUPPLY CHAIN ACCORDING TO AUTHENTICATION OF THEIR RFID TAG

FIG. 7  HANDLING ITEMS IN SUPPLY CHAIN ACCORDING TO AUTHENTICATION OF THEIR RFID TAG

ARRANGEMENT FOR AUTHENTICATING RFID TAG

RFID READER SYSTEM CONFIGURATION WITH
OPTIONAL LOCAL AND REMOTE COMPONENTS

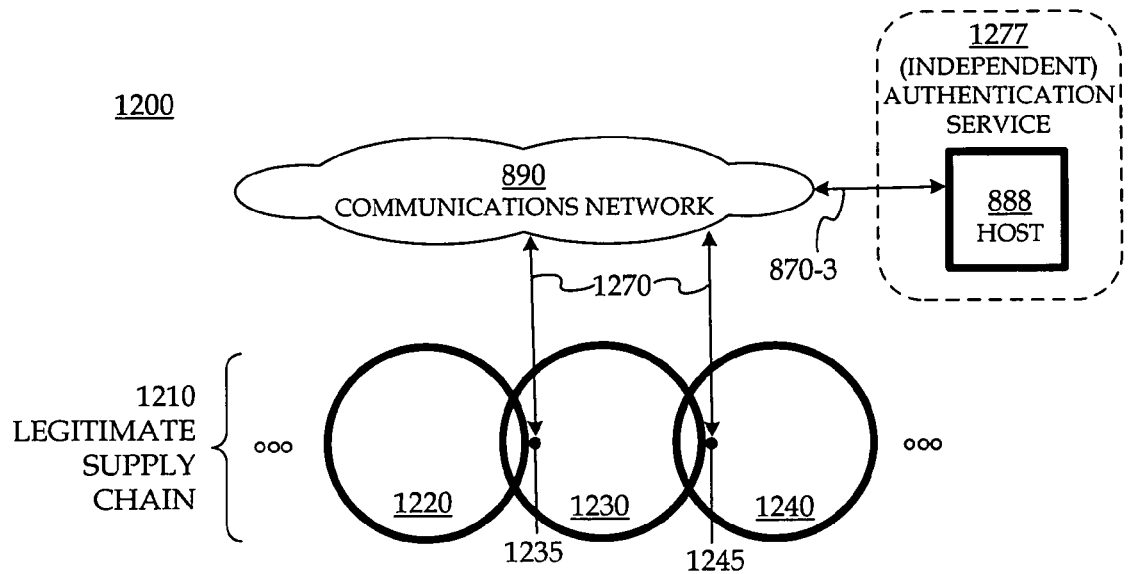
FIG. 12  *HOST SEPARATE FROM SUPPLY CHAIN, E.G. BY AUTHENTICATION SERVICE*
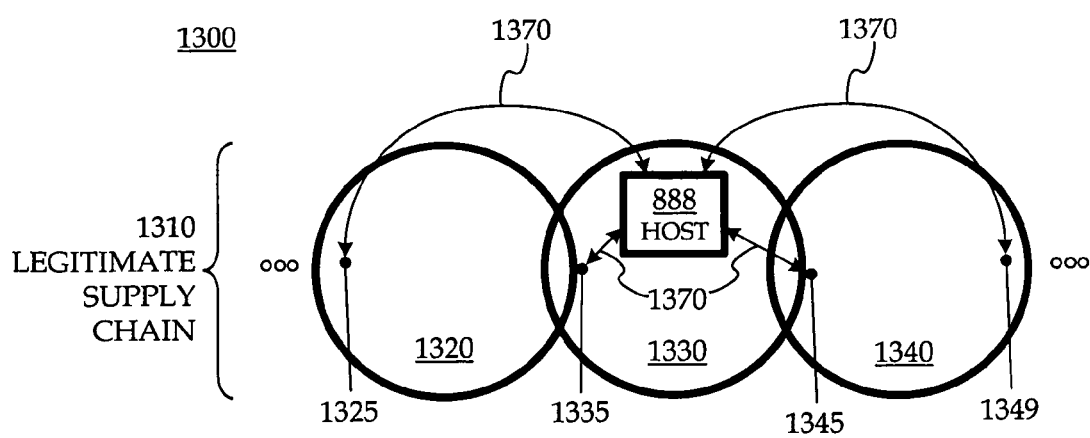
FIG. 13  *HOST(S) WITHIN LINK(S) OF SUPPLY CHAIN*

HOST FOR REFERENCE DATABASE

REPORTING ON AUTHORIZATION OF RFID TAGS
BY REFERENCE DATABASE

REPORTING ON AUTHENTICATION OF RFID TAGS FOR INDICATING LEGITIMACY OF THEIR ASSOCIATED ITEMS

RELATED APPLICATIONS

This utility patent application claims the benefit of U.S. Provisional Application Ser. No. 60/749,864 filed on 2005 Dec. 12, which is hereby claimed under 35 U.S.C. §119(e). The provisional application is incorporated herein by reference for all purposes.

The present application may be found to be related to U.S. patent application entitled: "HANDLING LEGITIMATE AND UNAUTHORIZED ITEMS IN SUPPLY CHAIN ACCORDING TO AUTHENTICATION OF THEIR RFID TAGS", Ser. No. 11/637,372, filed with the USPTO on the same day as this patent application.

The present application may be found to be related to U.S. patent application entitled: "DETERMINING AUTHENTICATION OF RFID TAGS FOR INDICATING LEGITIMACY OF THEIR ASSOCIATED ITEMS", Ser. No. 11/637,479, filed with the USPTO on the same day as this patent application.

TECHNICAL FIELD

The present description addresses the field of Radio Frequency IDentification (RFID) systems, and more specifically to systems, devices and methods for reporting on whether RFID tags are authenticated, to indicate the legitimacy of items they are attached to.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A problem has been that legitimate supply chain activities are undermined by illegitimate activities. This problem is now described in more detail.

FIG. 1 is a conceptual drawing of a legitimate supply chain 110. Various links 120, 130, 140, 150, 160, 170, 180 are shown as circles, partially overlapping at nodes to conceptually suggest a chain. Each one of these links shows a possible representative activity. A supply chain may have any number of links, similar or different than the links of chain 110, and so on.

Link 120 is for a manufacturer 120, which manufactures an item 125. Item 125 can be anything that is bought and sold for money, such as a consumer good, a component for a consumer good, and so on. Item 125 travels within the chain according to the general direction of arrow 127. For example, item 125 can be transported according to transportation links 130 and 140, and then stored in a warehouse 150. Warehouse 150 can serve as a distribution center, from where item 125 can be directed, via another transport link 160, to a desired retail outlet 170. While there, it can be bought by consumer 180, for money 185.

Money 185 ultimately pays for item 125. Here money 185 is shown traveling within chain 110 according to the general direction of arrow 187, opposite of arrow 127, for paying for every one of the activities and services of chain 110. Payment, however, need not be made explicitly at each node between successive links. Items can be manufactured and delivered across links according to supply agreements, while payment is made according to arrangements specified in related legal agreements.

FIG. 2 is a conceptual drawing of supply chain 110, further showing a domain 210 of illegitimate activities that undermine legitimate supply chain 110. Activities in domain 210 are sometimes called gray market activities, and include storing and transporting 211. In addition, counterfeiting 213 results in a counterfeit item 215 in domain 210.

Domain 210 also includes unauthorized overproduction 216 by a manufacturer 120. That is, even a legitimate manufacturer 120, after fulfilling an order to manufacture a certain supply of items 125, manufactures more of them and sells them in the gray market. Domain 210 can also include theft 226 from any link in chain 110, which results in item 125 being diverted into the gray market.

Items emerge from illegitimate domain 210 by a number of activities, such as introduction or reintroduction 237 into legitimate supply chain 110, fraudulent returns 238 by some posing as consumers, and direct sales 239 to consumers 180.

The illegitimate activities of domain 210 hurt honest businesses, and in turn consumers in the form of higher prices.

The problem of introduction or reintroduction 237 and fraudulent returns 238 is now described in more detail.

FIG. 3 is a conceptual diagram showing an offered transaction 300 at a link 310. Link 310 can be a link of a legitimate supply chain, or at an inspection point, such as a Customs Office. A party 321, who is also known as an offeror, offers according to arrow 327 an item 325 that is also known as the proffered item. Proffered item 325 is offered for acceptance by an agent or operator 311 within link 310.

Agent 311 does not know whether proffered item 325 is legitimate or not. Agent 311 may be concerned about accepting items in such transactions, if the items are illegitimate. Indeed, the activity of offering (arrow 327) could be part of the legitimate progress 127 of item 325 within a supply chain, or a fraudulent import, or a fraudulent reintroduction 237, or even a fraudulent return 238.

The concern of agent 311 is shown by thought bubble 343. Should he accept (387) the proffered item 325? Should he also pay or promise to pay money 385 for it, or give it an import license 386?

Note that the concern is not alleviated by the fact that proffered item 325 is even tagged by an RFID tag 320. The concern can also be whether tag 320 is legitimate, or stolen, counterfeit, cloned by replicating the data of a legitimate tag, etc.

SUMMARY

The invention improves over the prior art.

More particularly, RFID readers, computers, software, and methods are provided for reporting on the authentication of one or more RFID tags associated with a proffered item, while requiring special permissions be cleared before reporting. In some embodiments, a question is input about whether a Declared Password (DP) is regarded as proper for an Item Identifier (II), both of which have been input from the tags. An answer is generated for the question from the reference database, and transmitted to the user. The answer does not reveal an Actual Code that is indeed regarded as proper, unless the user first demonstrates that he already knows it.

Beyond the authentication of the RFID tag, the answer can further indicate the legitimacy of the proffered item. When an item's RFID tag data is not authenticated, a conscientious person can refuse to accept it; a Customs Agent can intercept it, etc. This will in turn diminish the incentive for illegitimate activities.

The invention offers the advantage that protection is accomplished by how the reference database is hosted. This avoids the need to add defensive features to the RFID tags, so they could withstand attacks. As such, the expense of generating RFID tags need not increase.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 5 is a conceptual diagram showing an offered transaction at the same link of a legitimate supply chain as in FIG. 3, along with an example of how a previous concern about accepting items in such transactions can be resolved at least partially according to embodiments if the RFID tag of FIG. 4 is used.

FIG. 12 is a diagram of a partial section of a legitimate supply chain like that of FIG. 11, where further a host of the reference database is implemented separately from the supply chain according to embodiments.

FIG. 13 is a diagram of a partial section of a legitimate supply chain like that of FIG. 11, where further a host of the reference database is implemented within one of the links of the supply chain according to embodiments.

DETAILED DESCRIPTION

Figure 1:
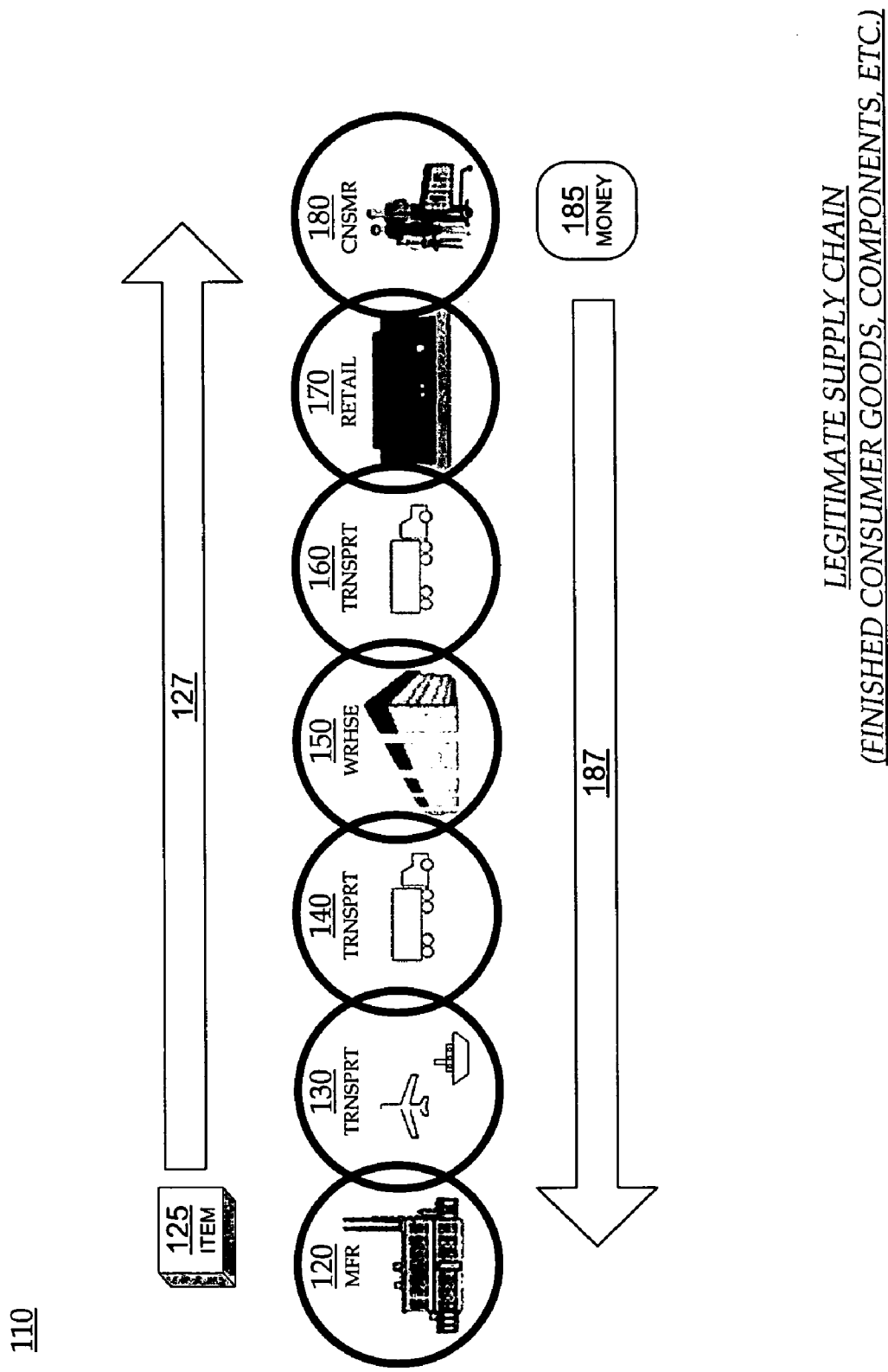
FIG. 1 is a conceptual drawing of a legitimate supply chain.
Figure 2:
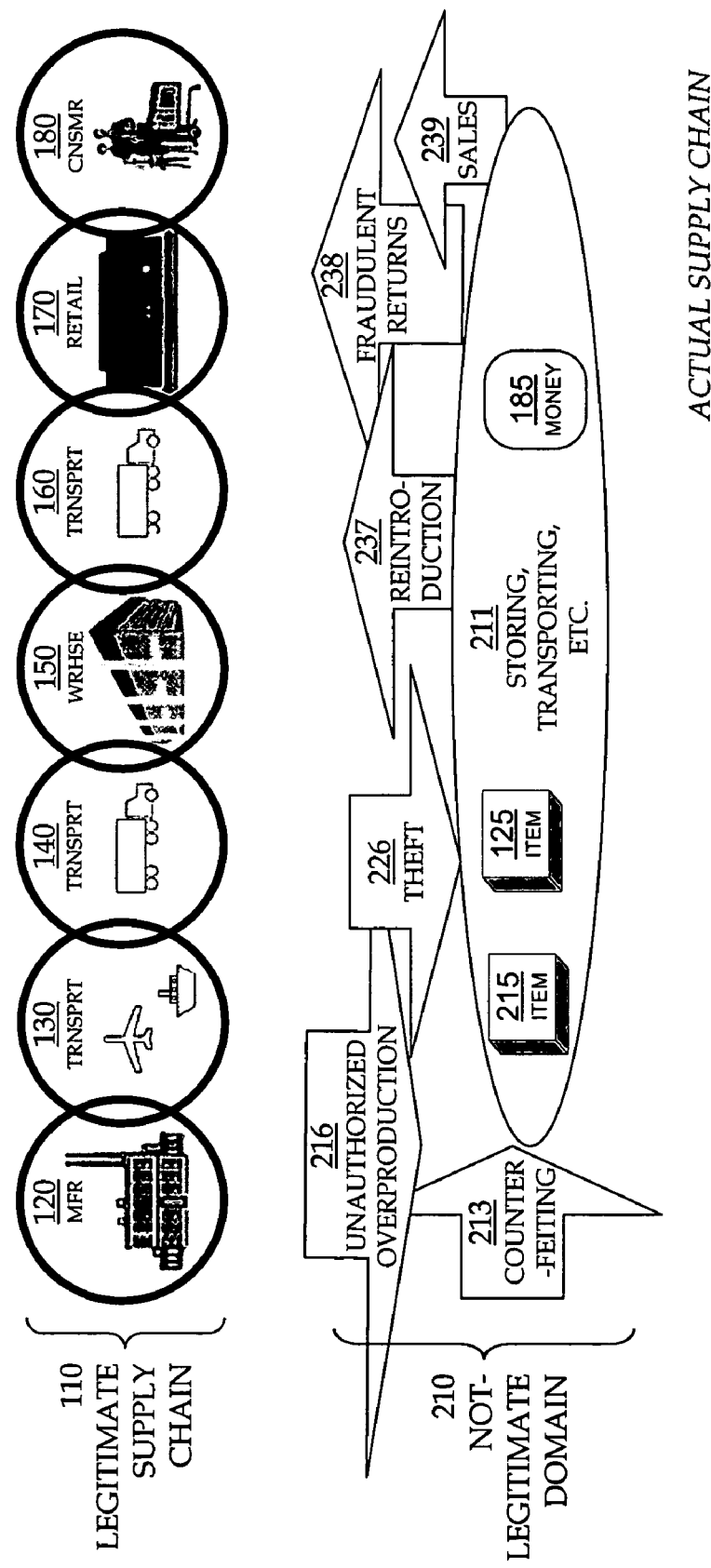
FIG. 2 is a conceptual drawing of the supply chain of FIG. 1, further showing a domain of illegitimate activities that undermine the legitimate supply chain.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. This description is, therefore, not to be taken in a limiting sense.

As has been mentioned, the present invention includes a scheme for authenticating RFID tags, to indicate the legitimacy of their associated items. The scheme is now described in more detail.

Figure 4:
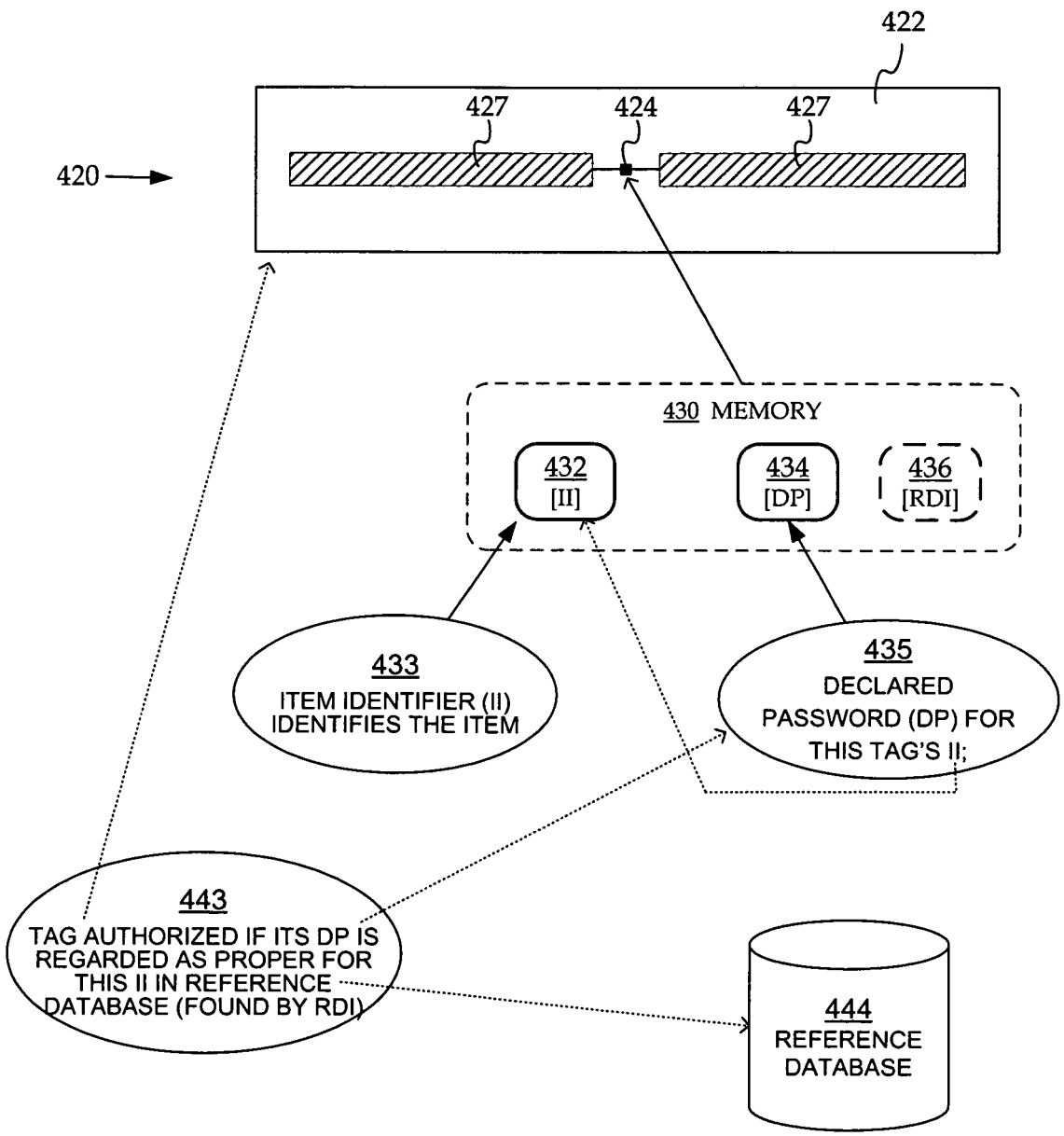
FIG. 4 is a diagram showing components of an RFID tag according to embodiments, which can be attached to a proffered item of FIG. 3.

FIG. 4 is a diagram of an RFID tag 420, which can be used for practicing the invention. Tag 420 is implemented as a passive tag, meaning it does not have its own power source. Much of what is described in this document, however, applies also to active tags.

Tag 420 is formed on a substantially planar inlay 422, which can be made in many ways known in the art. Tag 420 includes an electrical circuit, which is preferably implemented in an integrated circuit (IC) 424. IC 424 is arranged on inlay 422.

Tag 420 also includes an antenna for exchanging wireless signals with its environment. The antenna is usually flat and attached to inlay 422. IC 424 is electrically coupled to the antenna via suitable antenna ports (not shown).

The antenna may be made in a number of ways, as is well known in the art. In the example of FIG. 4, the antenna is made from two distinct antenna segments 427, which are shown here forming a dipole. Many other embodiments are possible, using any number of antenna segments.

In some embodiments, an antenna can be made with even a single segment. Different places of the segment can be coupled to one or more of the antenna ports of IC 424. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 424. IC 424 both harvests power, and responds if appropriate, based on the incoming signal and its internal state. In order to respond by replying, IC 424 modulates the reflectance of the antenna, which generates the backscatter from a wave transmitted by the reader. Coupling together and uncoupling the antenna ports of IC 424, in rapid succession, can modulate the reflectance, as can a variety of other means.

In the embodiment of FIG. 4, antenna segments 427 are separate from IC 424. In other embodiments, antenna segments may alternately be formed on IC 424, and so on.

The electrical circuit in IC 424 includes a memory 430, which can store data 432, 434, and optionally 436. These data are typically in the form of 0s and 1s, whose combination means something, either directly according to protocols, or by encryption. Such data is written at different portions of memory 430, as will be evident to a person skilled in the art, referenced by proper pointers, and so on. These data can be communicated to an RFID reader that interrogates RFID tag 420, as will be described later in this document.

In the example of FIG. 4, data 432 is for an Item Identifier (II). According to a comment 433, the II can be a code for identifying the item that tag 420 is associated with. For more robustness, it is preferable that, if RFID tagged items are presented in a group, each tag 420 have its own unique II 432, although that is not necessary.

Any code can be used as an II, or a portion of an II. For example, the II can include a designation about the item, which is assigned according to a proprietary scheme of assigning identifying numbers. Or the scheme can be a scheme known to the public, such as devised by an organization called EPCglobal. EPCglobal's scheme includes numbers that are unique, and are called Electronic Product Code (EPC). In addition, one or more IIs can be used for the item.

In addition, data 434 is a stored Declared Password (DP). According to a comment 435, DP 434 is a declared password for II 432. In some embodiments, DP 434 can be read from tag 420 separately from II 432. In some embodiments, DP 434 can be inputted by being interpreted from II 432.

Any code can be used as a DP, or a portion of a DP. For example, a DP can be a binary code, such as 4, 8, or 16 bits long. All or a portion of it can optionally be generated by a random process, to confound efforts to discern patterns in numbering of tags. Or a portion of the DP can designate another action pertaining to the item that tag 420 is attached to, namely it can be a date stamp or time stamp for its receipt, and so on. In addition, one or more DPs can be used for an II.

According to a comment 443, tag 420 is authorized, i.e. considered legitimate, if its DP 434 is regarded as proper for its II 432 according to a reference database 444. Of course, to preserve the secrecy of which DPs correspond to which IIs, access to the data of reference database 444 is controlled by permissions according to a variety of possibilities, as described later in this document.

In some instances, reference database 444 is a default for the transaction. In other instances, reference database 444 is identified with the help of Reference Database Identifier (RDI) data 436. RDI data 436 can be obtained from tag 420, separately from it, e.g. electronically from another party, or both. For example, RDI data 436 can be a reference database identifier code.

RDI data 436 can be obtained from tag 420 in a number of ways. One such way is to scan tag 420 with an RFID reader, and read out RDI data 436 along with II data 432 and DP data 434. Another way is to assign an II such that the RDI can be determined from the II 432. One more way is to assign a DP such that the RDI can be determined from the DP 434.

In some instances, reference database 444 is accessible by an electronic communications network. This is preferable if reference database 444 is hosted by an Authentication Service for IIs, or the like. In those instances, the first RDI can be used to identify reference database 444 in the network. For example, it can include a network address, or contact information for an operator of the database, such as the Authentication Service.

As will be realized, a number of implementations are possible. For example, one RDI can correspond to one II, and be used to select between one or more inputtable IIs. Selection can be according to consistency in coding, locations in tag memory 430 of where data 432, 434, 436 is stored, etc. In addition, one RDI can correspond to one DP, and be used to select between one or more inputtable DPs, and so on. Multiple RDIs can be available, and one or more can be used for a pair of II and DP to authenticate tag 420, and so on.

Figure 3:
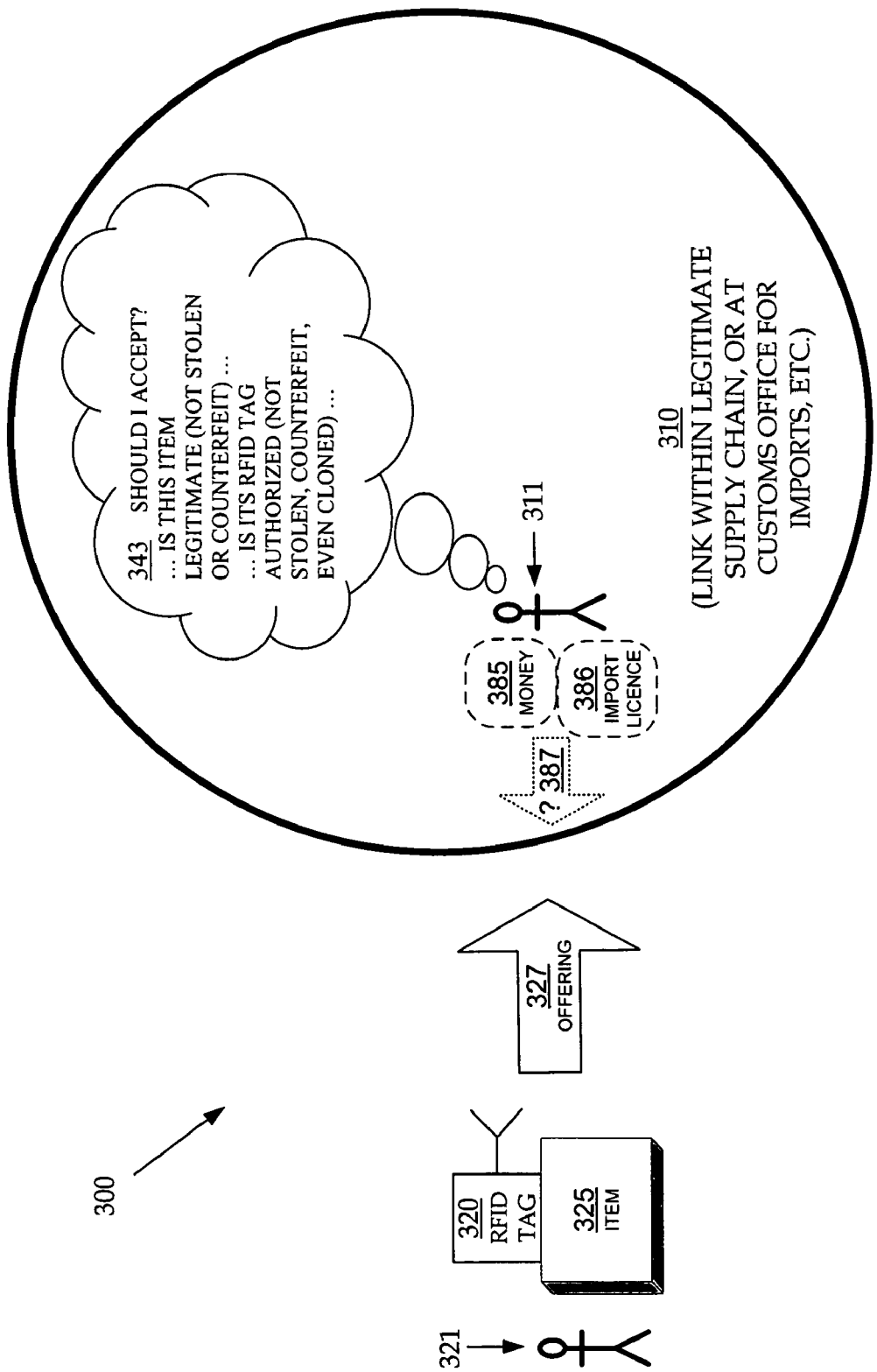
FIG. 3 is a conceptual diagram showing an offered transaction at a link of a legitimate supply chain, and a concern about accepting items in such transactions that could be illegitimate as per an illegitimate reintroduction activity and fraudulent return activity of FIG. 2.

FIG. 5 is a conceptual diagram showing an offered transaction 500 at link 310 of FIG. 3. An offering party 521 offers (arrow 527) an item 525 that is tagged by RFID tag 420 of FIG. 4. Now, however, agent 311 need not have the same concern shown by thought bubble 343 in FIG. 3. Instead, according to another thought bubble 543, they can authenticate tag 420, and act accordingly.

Figure 6:
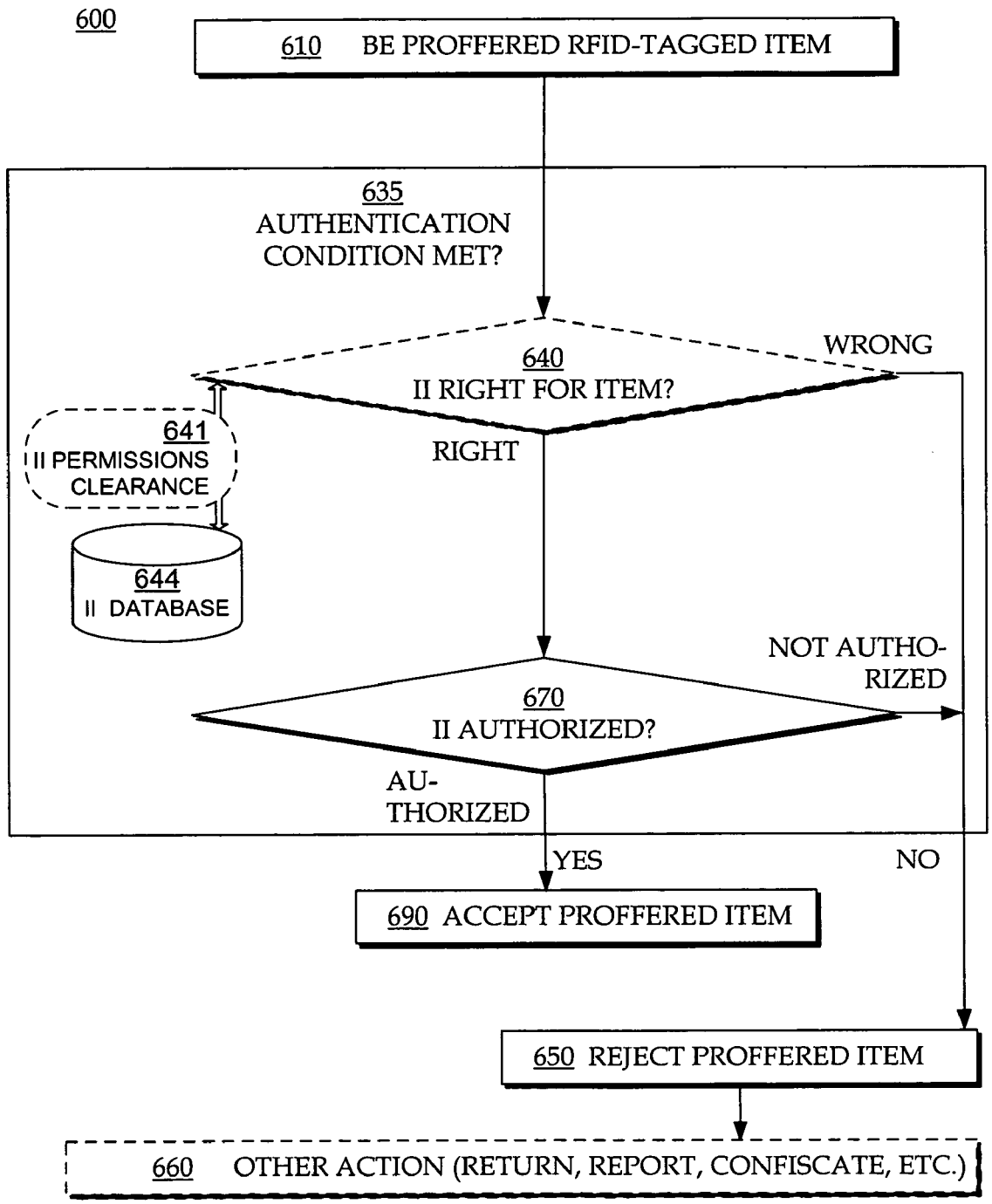
FIG. 6 is a flowchart illustrating particular methods according to embodiments for handling items in supply chain according to authentication of their RFID tags.

FIG. 6 is a flowchart 600 illustrating particular methods according to embodiments, for handling RFID-tagged items in a supply chain according to authentication of their RFID tags. The methods of flowchart 600 can be practiced by a party to an exchange or transaction, a party inspecting items such as a Customs Office, their agent, employee, operator, and so on. The exchange or transaction can be part of a proposed legal agreement as also described elsewhere in this document. Flowchart 600 can thus serve as instructions to party 311 of FIG. 5.

At optional operation 610, a party can be proffered an item, which is associated with one or more Radio Frequency Identification (RFID) tags. Proffering can be as shown above in FIG. 5. The proffered item can be associated with one or more Radio Frequency Identification (RFID) tags in any number of ways. One or more RFID tags can be used for the item. If the item includes individual components, the item may have multiple tags, even if each component started out with only one tag. The RFID tag or tags can be attached to the item, or to its package. The attachment can be removable or not, and so on, as is known in the art of RFID tagging.

At next operation 635, it is determined whether an authentication condition is met. If it is not met, then at next operation 650, the item proffered at operation 610 is rejected for the proposed exchange or transaction. In the case of imports, rejection can be by denying importation. At optional next operation 660, another action can be taken, such as returning the item if already delivered, reporting the proposed transaction, confiscating the item for surrendering it to authorities, destroying it in some circumstances, and so on. If, at operation 635, the authentication condition is met, then at next operation 690, the proffered item is accepted for the exchange or transaction or importation.

A number of authentication conditions can be used according to the invention. In the preferred embodiment, the authentication condition includes that an Item Identifier (II) can be read from the one or more RFID tags of operation 610. The readable II can be stored either in a single tag, or in a combination of tags, which can be cooperating or not. If the item is scanned by an RFID reader, the II will be read.

According to some optional embodiments, it can be required that, according to operation 640, the II be listed as corresponding to the proffered item in an Item Identifier (II) database 644. This way agent 311 can check whether the II of the tag is realistic for the proffered item. Checking will depend on how II database 644 is hosted.

II database 644 can be hosted so that it is accessible publicly, or with very few restrictions, such as merely registering a user by name, not affiliation type. For example, if the II is the EPC, the organization that administers them (EPCglobal) can offer a lookup system.

Alternatively, II database 644 can be hosted so that it is accessible privately, for one, two, or more parties that have permissions, as indicated by optional II permissions clearance block 641.

As will be realized from this entire document, in some instances it behooves agent 311 and others in the supply chain to insist that a consistent Item Identifier be used for each transition or transaction of the item, as it advances through the links of the supply chain. This way verifiability will be improved. One such way is for all to implement a well known and easily accessible system, like the EPC system.

The authentication condition can also include, as indicated at operation 670, that the II be authorized. In many embodiments, this means that a stored Declared Password (DP) can be inputted from the one or more RFID tags, and that the DP is regarded as proper for the II, as per a reference database, whose data is available only subject to permissions. In some preferred embodiments, the DP is readable from the same RFID tag as the II.

Figure 7:
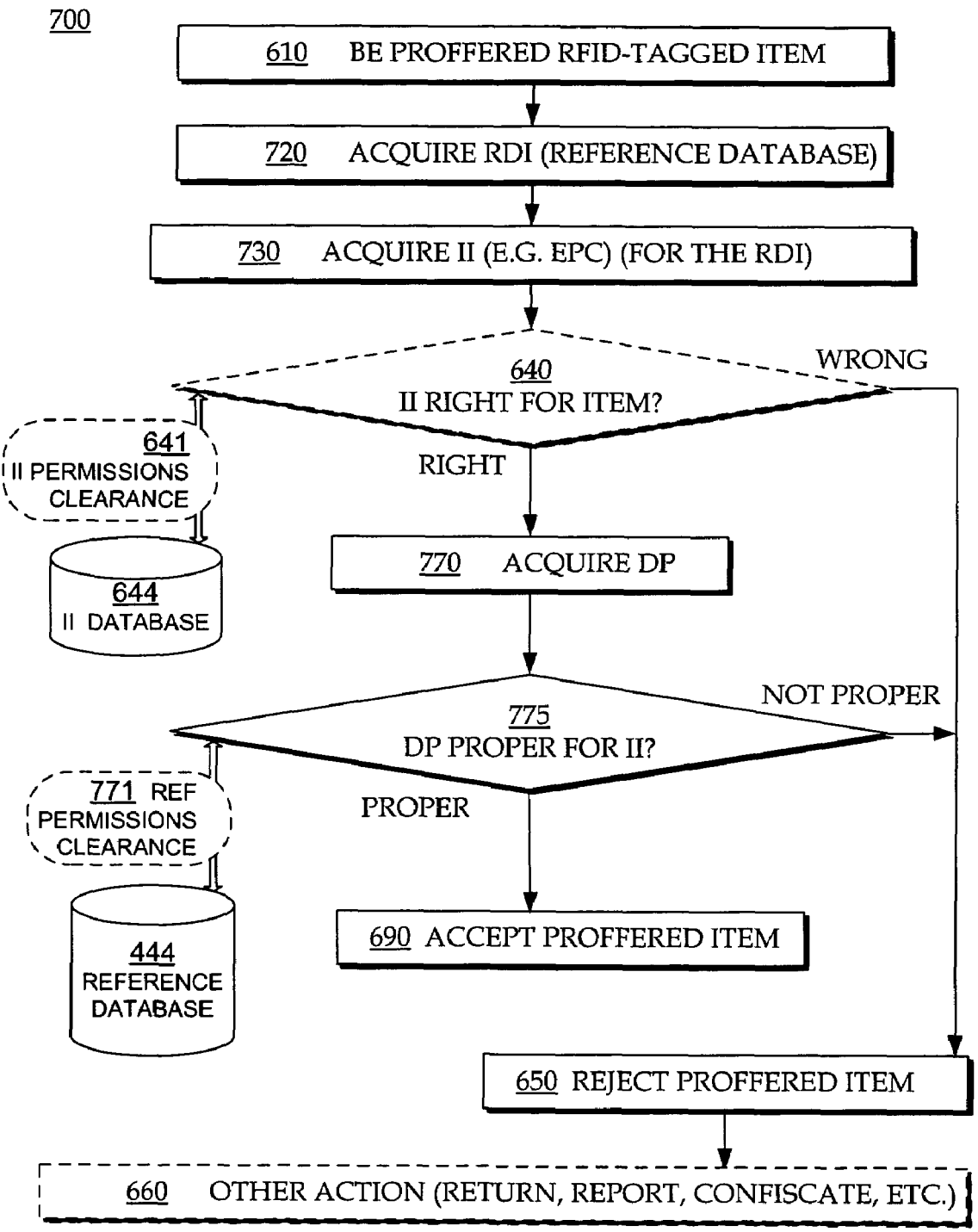
FIG. 7 is a flowchart illustrating preferred embodiments of the methods of FIG. 6.

FIG. 7 is a flowchart 700 illustrating preferred embodiments of the methods of FIG. 6. It will be recognized that a number of operations in flowchart 700 are identical to those already described in flowchart 600.

At optional operation 720, an RDI is acquired. The RDI corresponds to data 436 of tag 420, and can be acquired either by scanning the item that has tag 420 on it, or be received separately from a party proffering the item tagged with tag 420, or otherwise be or become known. In some embodiments, it can be required that the RDI be readable from the tag as part of the authentication condition.

At optional operation 730, an II is acquired. The II corresponds to data 432 of tag 420, and can be acquired either by scanning the item that has tag 420 on it, or be received separately from a party preferring the item tagged with tag 420, or otherwise be or become known.

Operation 730 enables optional operation 640 to take place. If the II is wrong for item 525, then the proffered item can be rejected, as per operation 650.

If the II is right for item 525, then it is determined whether the II is authorized. At a next operation 770, an inputtable DP is acquired. At a next operation 775, it is determined whether the acquired DP is regarded as proper for the acquired II by the reference database identified by the RDI of operation 720. Execution proceeds according to the determination, with accepting the item (operation 690) if the DP is regarded as proper, or rejecting the item (operation 650) if the DP is not proper.

Operation 775 may be performed in any number of ways, as will be seen in this document. One such way is to construct a question about whether the acquired II is regarded as proper for the acquired DP, and apply the question to the reference database. The reference database can be the same as was described for reference database 444. Depending on how reference database 444 is hosted, a REF ('reference database') permissions clearance block 771 may have to be cleared. REF permissions clearance block 771 may be the same or different than II permissions clearance block 641, and represents a group of permissions.

In a preferred embodiment, the REF permissions include that a DP that is indeed regarded as proper for the readable II is generally not revealed to the offeror. It is revealed only indirectly, if the offeror first demonstrates they already know of a DP that is regarded as proper for the readable II. The reason this is preferred is to ensure that an offeror within the not legitimate domain cannot learn a valid DP, and write it to the tag memory. It will be understood that, even if they obtain a valid DP by scanning an authorized similar item, that obtained DP will become invalid if and when the owner of the authorized similar item changes the DP, both on the tag and on the reference database.

The REF permissions can include variations. For example, a DP that previously could be determined as regarded as proper for the readable II can be revealed to the offeror, but it will be of no more value, and so on.

Another variation is that the same restriction also applies to agent 311; in other words, they cannot learn from the reference database the valid DP, but only get their questions answered about whether a proposed DP is regarded as proper. This way agent 311 learns the valid DP only if he first demonstrates he already knew it.

In some embodiments, the REF permissions include that agent 311 needs no permission to be able to determine whether an inputtable DP is regarded as proper for the readable II by the reference database. This could be with or without agent 311 being required to merely register as a user by name, and possibly receiving a user code when they log in.

In other embodiments, the REF permissions include that agent 311 needs further permissions to be able to determine whether an inputtable DP is regarded as proper for the readable II by the reference database. In some of these embodiments, they may obtain review privileges, such as from the offeror 321. In some of those embodiments, agent 311 can then deny other privileges to offeror 321, thus continuing the chain of succession. The ability to change the DP is one such opportunity—once agent 311 changes it upon accepting the proffered item, agent 321 can no longer change it. There can be also other abilities, such as ability to access the readable II, and so on.

The reference database may be local. In other embodiments, the reference database is remote, and accessed over an electronic communications network. This is preferred, if the REF permissions of clearance block 771 are to be enforced. Another such way is to form a local database with data received from the reference database, and then perform the determination with the data received in the local database. The determination can be performed by an RFID reader, or related software components, or other instrumentalities, as will be seen in FIG. 8.

If the acquired DP is not regarded as proper for the acquired II, a suitable report can be generated, which can be called a lack of authentication report. Such a report can be generated by any involved party, or even the host itself of the reference database, as will be seen later in this document in more detail. Any number of items can be included in the report, such as a time, a date, the acquired II, the acquired DP, and other data about the item being proffered. The lack of authentication report, or a version of it, can be caused to be transmitted to a monitoring party, such as a specially contracted party, or a police department. Transmission could be across an electronic communications network. In addition, a version of the lack of authentication report can be caused to be written to the one or more RFID tags, if they are available.

In some embodiments, one could determine from operation 780 that the acquired II is not regarded as proper for the acquired DP. In addition, one could further determine that the proffered item has been declared in the reference database as missing.

As will be realized, the authentication condition can relate only to the tag data. In some embodiments, the party being proffered the item, e.g. party 311, can acquire this data by scanning the tag. It is noteworthy that, in other embodiments, the above described data about the tag can become known before the item is received.

More particularly, the II and the DP can be acquired independently from receiving the item with the one or more RFID tags. They can be furnished before physically receiving the proffered item with the one or more RFID tags. For example, party 521 can before actually delivering item 525, learn this data by reading the tag, and then transmit this data to party 311 for authentication in advance. If the authentication condition is not met, then party 311 can reject the proffered item without physically receiving it. In fact, party 311 can inform party 521 to not even bother delivering. Additionally, if the proffered tagged item is expected but not physically received when expected, the reference database can be updated to declare the item as missing.

Additionally, if the proffered tagged item is expected but not physically received when expected, the reference database can be updated to declare the item as missing.

In other embodiments, the proffered item is physically received, and the II and the DP are acquired by scanning the delivered item with an RFID reader. Again, if the DP is regarded as not proper for the II, the delivered item can be returned without being accepted. Or it can be made available to legal authorities.

In such instances, it is advisable to think of the whole manner of how the transaction takes place, and also reflect portions of it in the legal agreements. For example, it could be stipulated what constitutes delivery, what constitutes acceptance, and so on. Parties may consent in advance to forfeit items they proffer whose RFID tags do not meet the authentication condition, and so on.

In other embodiments the proffered item is received and scanned, but more time is needed to check the authentication condition. Such a received item can be tentatively stored and held in escrow without being accepted. Then it can be determined whether the DP is regarded as proper or not for the II. If not, the escrowed item can be returned, or made available to legal authorities, and so on.

In some embodiments, if the DP is regarded as proper for the II, an updated DP can be caused to be stored in the one or more RFID tags, in lieu of the DP that was stored there. This can be by writing over the DP, or writing the updated DP at a new location of the user memory, and adjusting a pointer, by cross referencing the II with the updated DP. In some of those embodiments, a whole new II can be written, and so on. This can take place whether the item is tagged with a single tag, or a system of cooperating tags, and so on. In addition, the reference database is changed, to regard the updated DP as now proper for the II, or the whole new II, etc.

Figure 8:
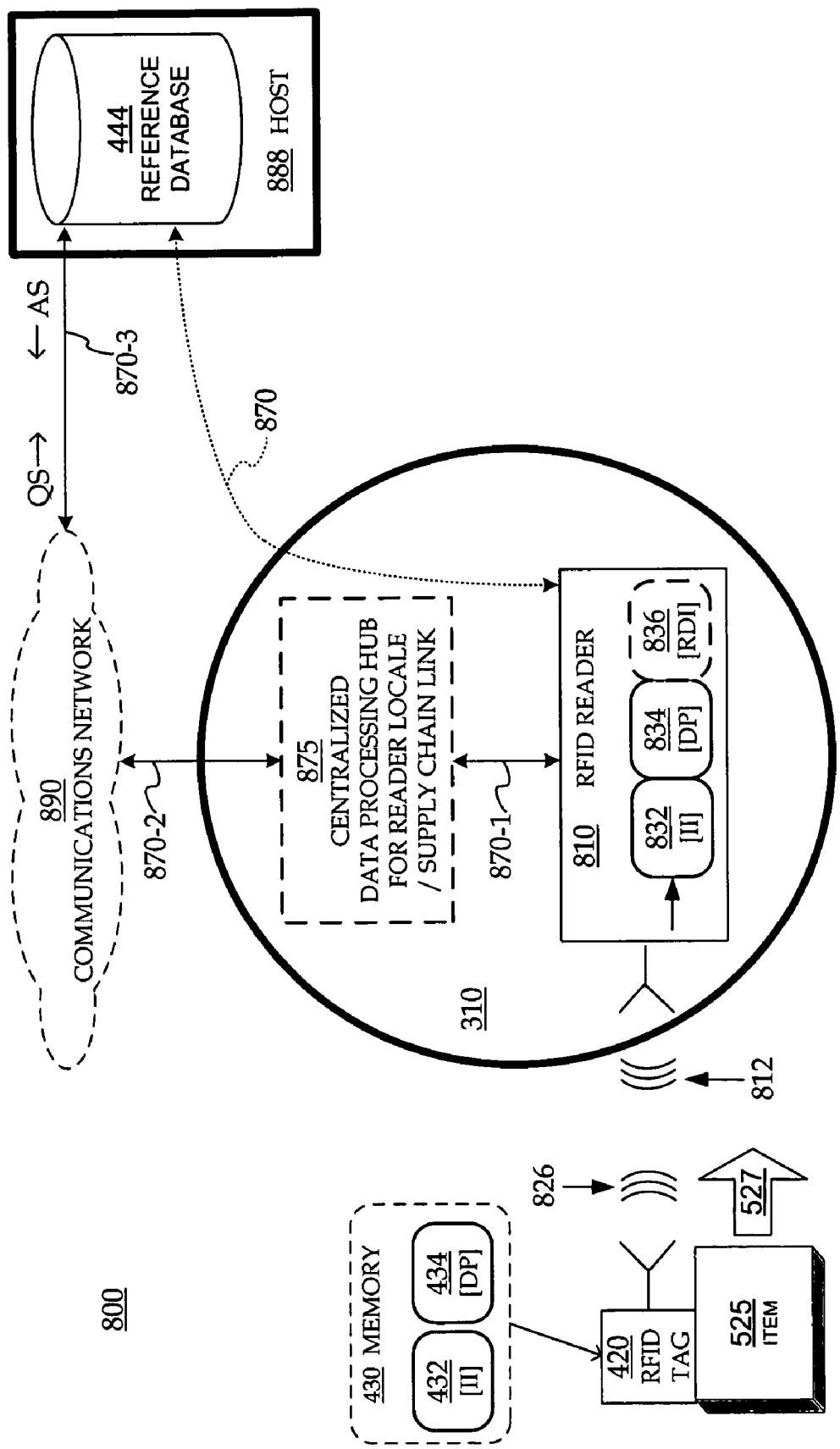
FIG. 8 is a diagram showing an overall arrangement according to embodiments for a legitimate link of a supply chain to authenticate the tag of FIG. 5 and implementing a method of FIG. 6 and FIG. 7 before accepting an item.

FIG. 8 is a diagram 800 showing an overall arrangement according to embodiments for authenticating the tag of FIG. 5, and implementing a method of FIG. 6 and FIG. 7. It will be appreciated that arrangement 800 can be implemented by any party that wants to determine whether the items or components they are receiving are legitimate, regardless of whether other parties in the chain do not make such a determination.

As in FIG. 5, the proffered item 525 has tag 420. Within link 310 there is now an RFID reader 810, suitable for scanning item 525 at it is delivered.

When RFID reader 810 scans item 525, it reads RFID tag 420 as follows. RFID reader 810 transmits an interrogating Radio Frequency (RF) wave 812. RFID tag 420 in the vicinity of RFID reader 810 senses interrogating RF wave 812, and generates wave 826 in response. RFID reader 810 senses and interprets wave 826.

Reader 810 and tag 420 exchange data via wave 812 and wave 826. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 810 and tag 420, they can be equivalently considered and treated as numbers having corresponding values, and so on.

In this case, data II 432 and data DP 434 are read from the tag, and stored in a memory of reader 810 as respectively data II 832, data DP 834, and optionally RDI 836. In the preferred embodiment, data II 432 is identical to data II 832, and data DP 434 is identical to data DP 834. It could be, however, that first data II 432 is stored in tag 420, while second data II 832 is stored in reader 810, the conversion from the first data II 432 to the second data II 832 taking place according to some rule like an II rule. Similarly, first data DP 434 could be stored in tag 420, while second data DP 834 is stored in reader 810, the conversion from the first to the second taking place according to some rule like a DP rule. Same also with data RDI 836.

RFID reader 810 is now described in more detail, before returning to FIG. 8.

Figure 9:
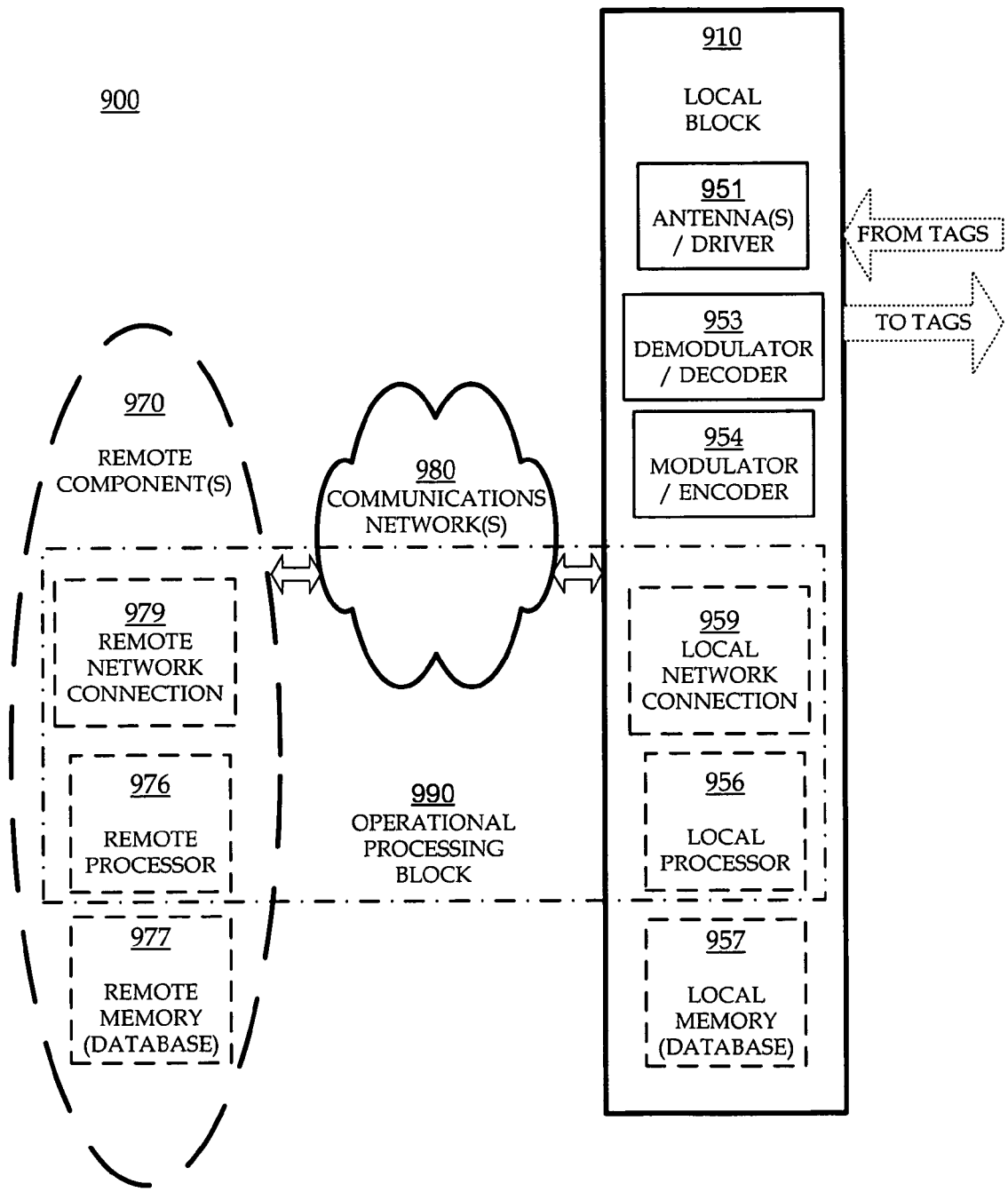
FIG. 9 is a diagram showing components of an RFID reader that can be implemented in the arrangement of FIG. 8.

FIG. 9 is a block diagram of a whole RFID reader system 900 according to embodiments. System 900 includes a local block 910, and optionally remote components 970. Local block 910 and remote components 970 can be implemented in any number of ways. It will be recognized that reader 810 of FIG. 8 is the same as local block 910, if remote components 970 are not provided. Alternately, reader 810 can be implemented instead by system 900, of which only the local block 910 is shown in FIG. 8.

Local block 910 is responsible for communicating with the RFID tags. Local block 910 includes a block 951 of an antenna and a driver of the antenna for communicating with the tags. Some readers, like that shown in local block 910, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 953 demodulates and decodes backscattered waves received from the tags via antenna block 951. Modulator/encoder block 954 encodes and modulates an RF wave that is to be transmitted to the tags via antenna block 951.

Local block 910 additionally includes an optional local processor 956. Processor 956 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 953, the encoding function in block 954, or both, may be performed instead by processor 956.

Local block 910 additionally includes an optional local memory 957. Memory 957 may be implemented in any number of ways known in the art. Such ways include, by way of examples and not of limitation, nonvolatile memories (NVM), read-only memories (ROM), random access memories (RAM), any combination of one or more of these, and so on. Memory 957, if provided, can include programs for processor 956 to run, if provided.

In some embodiments, memory 957 stores data read from tags, or data to be written to tags, such as Electronic Product Codes (EPCs), Tag Identifiers (TIDs) and other data. Memory 957 can also include reference data that is to be compared to the EPC codes, instructions and/or rules for how to encode commands for the tags, modes for controlling antenna 951, and so on. In some of these embodiments, local memory 957 is provided as a database.

Some components of local block 910 typically treat the data as analog, such as the antenna/driver block 951. Other components such as memory 957 typically treat the data as digital. At some point there is a conversion between analog and digital. Based on where this conversion occurs, a whole reader may be characterized as "analog" or "digital", but most readers contain a mix of analog and digital functionality.

If remote components 970 are indeed provided, they are coupled to local block 910 via an electronic communications network 980. Network 980 can be a Local Area Network (LAN), a Metropolitan Area Network (MAN), a Wide Area Network (WAN), a network of networks such as the internet, and so on. In turn, local block 910 then includes a local network connection 959 for communicating with network 980.

There can be one or more remote component(s) 970. If more than one, they can be located at the same place with each other, or in different places. They can access each other and local block 910 via network 980, or via other similar networks, and so on. Accordingly, remote component(s) 970 can use respective remote network connections. Only one such remote network connection 979 is shown, which is similar to local network connection 959, etc.

Remote component(s) 970 can also include a remote processor 976. Processor 976 can be made in any way known in the art, such as was described with reference to local processor 956.

Remote component(s) 970 can also include a remote memory 977. Memory 977 can be made in any way known in the art, such as was described with reference to local memory 957. Memory 977 may include a local database, and a different database of a Standards Organization, such as one that can reference EPCs.

Of the above-described elements, it is advantageous to consider a combination of these components, designated as operational processing block 990. Block 990 includes those that are provided of the following: local processor 956, remote processor 976, local network connection 959, remote network connection 979, and by extension an applicable portion of network 980 that links connection 959 with connection 979. The portion can be dynamically changeable, etc. In addition, block 990 can receive and decode RF waves received via antenna 951, and cause antenna 951 to transmit RF waves according to what it has processed.

Block 990 includes either local processor 956, or remote processor 976, or both. If both are provided, remote processor 976 can be made such that it operates in a way complementary with that of local processor 956. In fact, the two can cooperate. It will be appreciated that block 990, as defined this way, is in communication with both local memory 957 and remote memory 977, if both are present.

Accordingly, block 990 is location agnostic, in that its functions can be implemented either by local processor 956, or by remote processor 976, or by a combination of both. Some of these functions are preferably implemented by local processor 956, and some by remote processor 976. Block 990 accesses local memory 957, or remote memory 977, or both for storing and/or retrieving data.

Reader system 900 operates by block 990 generating communications for RFID tags. These communications are ultimately transmitted by antenna block 951, with modulator/encoder block 954 encoding and modulating the information on an RF wave. Then data is received from the tags via antenna block 951, demodulated and decoded by demodulator/decoder block 953, and processed by processing block 990.

Figure 10:
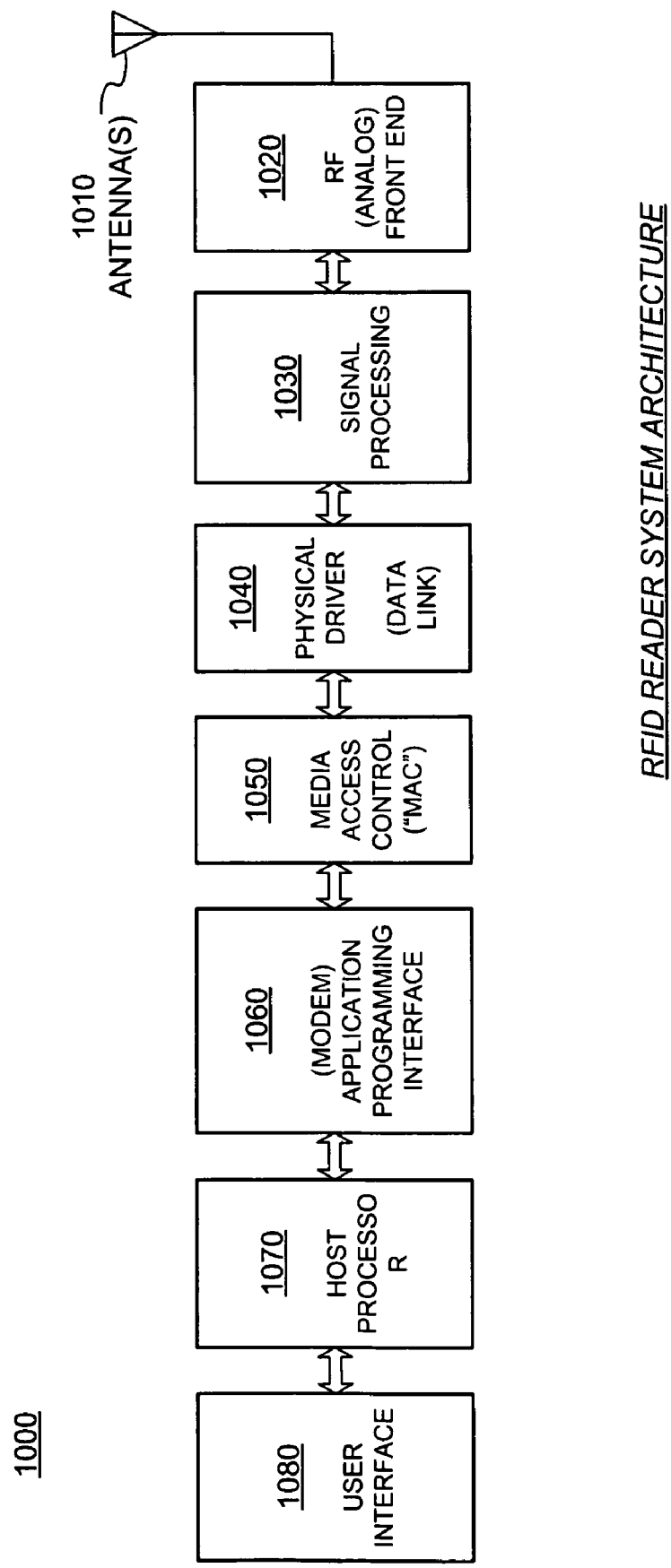
FIG. 10 is a block diagram illustrating an overall architecture of an RFID reader system according to embodiments that can be implemented in the arrangement of FIG. 8.

FIG. 10 is a block diagram illustrating an overall architecture of a RFID reader system 1000 according to embodiments, which can be used for implementing of RFID reader 810 and associated components.

RFID reader system 1000 can be implemented as a combination of hardware and software. It is advantageous to consider such a system as subdivided into components or modules. Each of these modules may be implemented by itself, or in combination with others. A person skilled in the art will recognize that some of these components or modules can be implemented as hardware, some as software, some as firmware, and some as a combination. An example of such a subdivision is now described.

It will be recognized that some aspects are parallel with those of FIG. 9. In addition, some of them may be present more than once.

RFID reader system 1000 includes one or more antennas 1010, and an RF Front End 1020, for interfacing with antenna(s) 1010. These can be made as described above. In addition, Front End 1020 typically includes analog components.

System 1000 also includes a Signal Processing module 1030. In this embodiment, module 1030 exchanges waveforms with Front End 1020, such as I and Q waveform pairs. In some embodiments, signal processing module 1030 is implemented by itself in an FPGA.

System 1000 also includes a Physical Driver module 1040, which is also known as Data Link. In this embodiment, module 1040 exchanges bits with module 1030. Data Link 1040 can be the stage associated with framing of data. In one embodiment, module 1040 is implemented by a Digital Signal Processor.

System 1000 additionally includes a Media Access Control module 1050, which is also known as MAC layer. In this embodiment, module 1050 exchanges packets of bits with module 1040. MAC layer 1050 can be the stage for making decisions for sharing the medium of wireless communication, which in this case is the air interface. Sharing can be between reader system 1000 and tags, or between system 1000 with another reader, or between tags, or a combination. In one embodiment, module 1050 is implemented by a Digital Signal Processor.

System 1000 moreover includes an Application Programming Interface module 1060, which is also known as API, Modem API, and MAPI. In some embodiments, module 1060 is itself an interface for a user.

System 1000 further includes a host processor 1070. Processor 1070 exchanges signals with MAC layer 1050 via module 1060. In some embodiments, host processor 1070 is not considered as a separate module, but one that includes some of the above-mentioned modules of system 1000. A user interface 1080 is coupled to processor 1070, and it can be manual, automatic, or both.

Host processor 1070 can include applications for system 1000. In some embodiments, elements of module 1060 may be distributed between processor 1070 and MAC layer 1050.

It will be observed that the modules of system 1000 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 1010 as signals, which are in turn processed successively by the various modules in the chain. Processing can terminate in any one of the modules. In a transmitting mode, initiation can be in any one of these modules. That, which is to be transmitted becomes ultimately signals for antenna(s) 1010 to transmit as wireless waves.

The architecture of system 1000 is presented for purposes of explanation, and not of limitation. Its particular subdivision into modules need not be followed for creating embodiments according to the invention. Furthermore, the features of the invention can be performed either within a single one of the modules, or by a combination of them.

Returning now to FIG. 8, reader 810 is coupled via a communication link 870 to reference database 444 described above. In this particular embodiment, reference database 444 is provided outside the control of link 310, although that is not necessarily the case, as will be seen later in this document.

Link 310 may optionally include a hub 875 within the control of its agents and employees. Hub 875 is a centralized data processing hub for link 310, or for the locale of reader 810. In some instances, two hubs may be provided, one for the link and one for the locale, and so on. Hub 875 is coupled with reader 810 via a communication link 870-1, through which data can be exchanged.

In some embodiments, a communications network 890 is provided. Network 890 can be an electronic communications network such as the internet. Network 890 is coupled with hub 875 via a communication link 870-2, and with reference database 444 via a communication link 870-3. As such, links 870-1, 870-2, and 870-3 together form link 870 in this embodiment.

It will be recognized that optional hub 875 and optional network 890 can equivalently be considered parts of reader 810, if one also considers the descriptions associated with FIG. 9 and FIG. 10.

It is noteworthy that communications from reader 810 and/or hub 875 result in transmitting across link 870-3 at least a question signal QS to reference database 444, when a determination is attempted as to whether a read DP 834 is regarded as proper for a read II 832. More particularly, question signal QS is first received by a host of reference database 444, as will be seen later in this document.

Moreover, an answer signal AS can be transmitted from reference database 444 across link 870-3 to hub 875 and/or reader 810. It will be recognized that signals QS and AS can travel all three links 870-1, 870-2, 870-3 at once, or at different times, such as for performing batch jobs. For example, read II and DP data from reader 810 can be stored in hub 875 for many tagged items, and later checked with reference database 444 when traffic via network 890 permits it.

Reference database 444 is hosted by a suitable host 888. Host 888 further controls permissions for accessing reference database 444, and performs other functions, as described in more detail later in this document.

When many links in a supply chain are equipped as shown in FIG. 8, different overall schemes can result. Some such schemes are now described.

Figure 11:
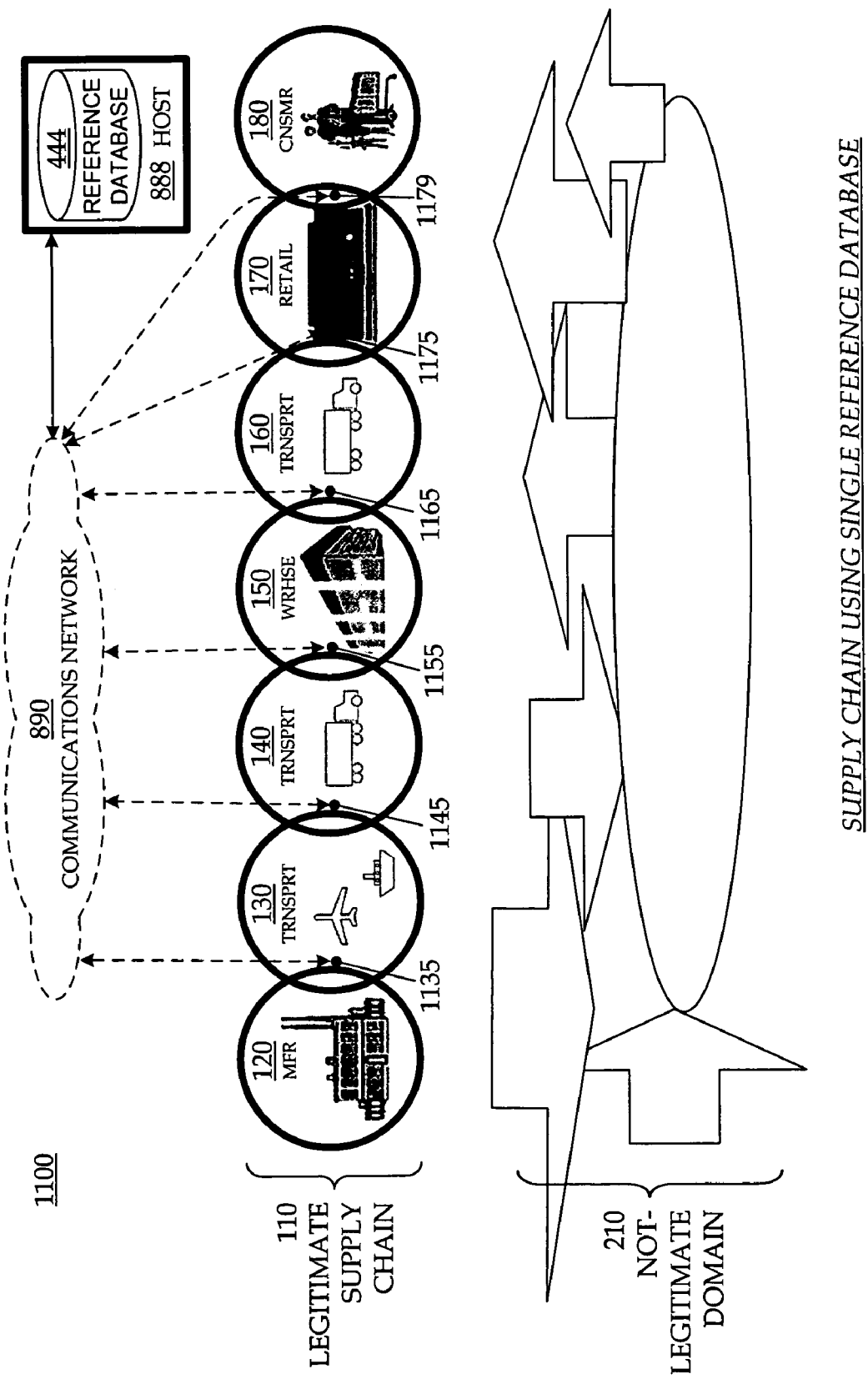
FIG. 11 is a conceptual drawing of the legitimate supply chain of FIG. 2, where some of the links are equipped like the link of FIG. 8, and all use a single reference database for authenticating RFID tags according to embodiments, regardless of where the reference database is hosted.

FIG. 11 is a conceptual drawing 1100 of legitimate supply chain 110, where some of the links are equipped like the link of FIG. 8. Further, all use a single reference database 444 for authenticating RFID tags of items they are proffered. In diagram 1100, it does not matter where host 888 is implemented.

For each of links 120, 130, 140, 150, 160, 170, authentication can take place at any suitable portion. Drawing 1100 also shows nodes 1135, 1145, 1155, 1165, 1175, and 1179. These nodes are locations within the supply chain where custody of items is transferred, and therefore is advantageous to have authentication take place there. Of course, authentication can take place at other nodes, and so on.

FIG. 12 is a diagram 1200 of a partial section of a legitimate supply chain 1210 like that of FIG. 11. Chain 1210 includes links 1220, 1230, 1240. These include nodes 1235, 1245, which further have communication links 1270 to electronic communications network 890. As also per the above, network 890 has a communication link 870-3 to host 888, for accessing the reference database (not shown in FIG. 12).

Host 888 is implemented separately from supply chain 1210 in these embodiments. In fact, it can be implemented by an Authentication Service 1277, whose function relative to supply chain 1210 is to authenticate RFID tags. Accordingly, Authentication Service 1277 can be independent, and even implemented as a business, charging fees for storing data, authenticating, DPs, maintaining users, permissions, generating reports, and the like.

FIG. 13 is a diagram 1300 of a partial section of a legitimate supply chain 1310 like that of FIG. 11. Chain 1310 includes links 1320, 1330, 1340. Host 888 is entirely within the control of link 1330, and thus the reference database (not shown in FIG. 13) is also wholly within the control of the owner of link 1330.

Links 1320, 1330, and 1340 include nodes 1325, 1335, 1345, 1349, which further have communication links 1370 with host 888, for accessing the reference database. Some of the links 1370 could use an external communications network, while others need not, as will be determined by a person skilled in the art.

Since the reference database is wholly within the control of the owner of link 1330, they can set up permissions any way they like. For example, they can give more permissions to themselves, than to the agents of the other links.

In fact, a number of schemes are possible that are hybrids of the above described. Additionally, such schemes can be superimposed on one another, with multiple DPs, and even multiple IIs per tag. Such determinations are made by the relative desires of supply chain participants, through their link, to control unauthorized items.

Figure 14:
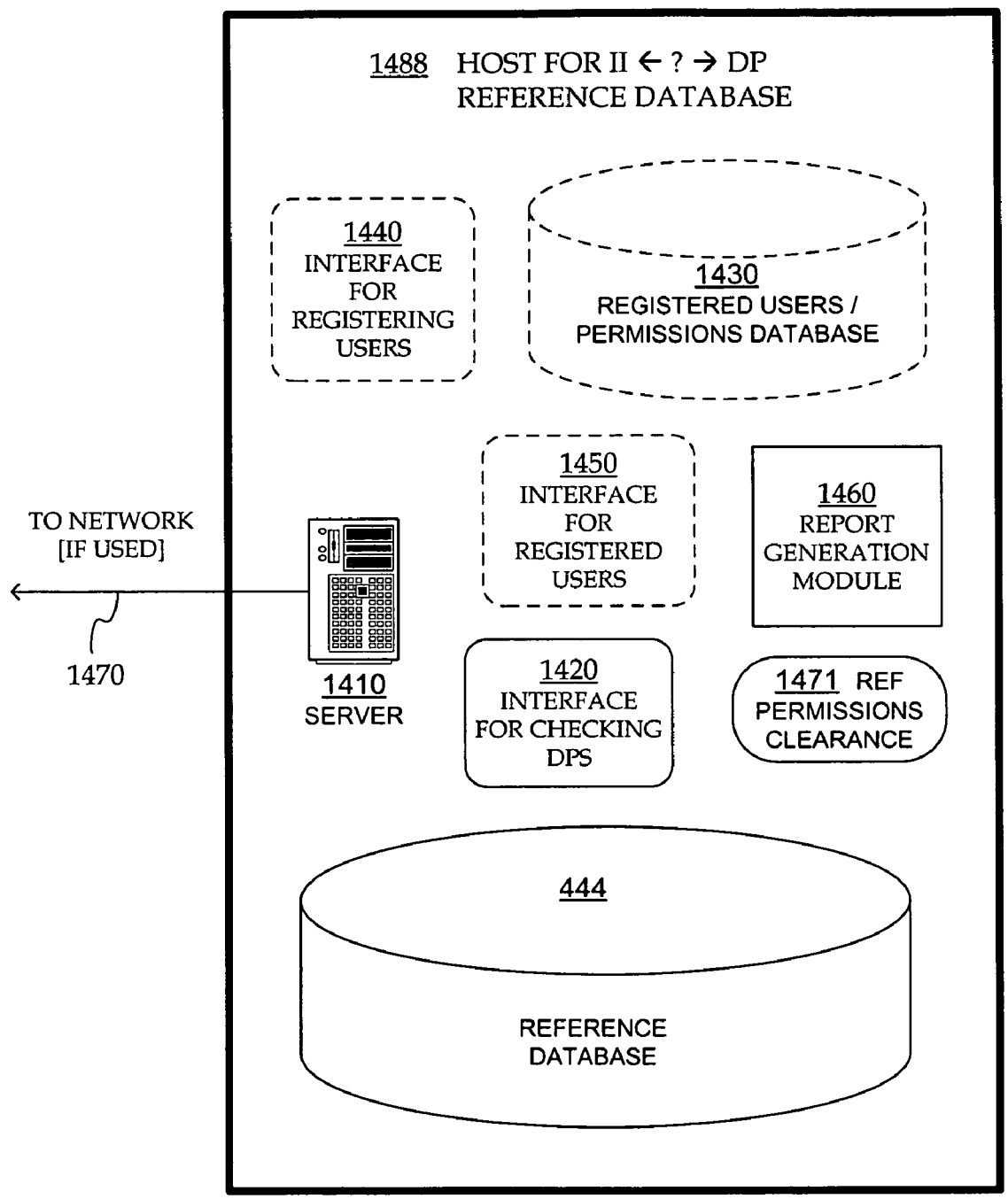
FIG. 14 is a block diagram according to embodiments for implementing a host for a reference database, such as that of FIG. 8.

FIG. 14 is a block diagram 1488 according to embodiments for implementing a host such as host 888 for reference database 444. As such, host 1488 includes reference database 444, which can be stored on a memory.

Host 1488 also includes machines such as computers, memory storage, programs, data, and the like as will be discerned from a person having ordinary skill in the art. In the embodiment of FIG. 14, host 1488 includes a server computer 1410, with a connection 1470 to an electronic communications network (not shown). Connection 1470 can be like connection 870-3, 1270, 1370, and so on. Additional structures and features of host 1488 are implemented on or supported by server 1410, or other computers, hardware, connected and interoperating as will be evident to a person skilled in the art.

Host 1488 also includes an interface 1420 for checking whether an inputted DP corresponds to an inputted II. As such, interface 1420 may communicate with server 1410, reference database 444, and other modules as designed.

Host 1488 moreover includes a permissions clearance module 1471, for example for implementing REF permissions clearance 771. Accordingly module 1471 may interact with interface 1420 reference database 444, and other modules as designed.

Host 1488 further includes an optional database 1430 for maintaining registered users, and optionally also their allocated permissions, and so on. As will be realized, database 1430 can be implemented in conjunction with reference database 444.

Host 1488 additionally includes an optional interface 1440 for registering users, and thus permitting remote users to affect at least some of their data in database 1430. It can also include a related optional interface 1450 for registered users to log in, and access interface 1420.

Host 1488 can also include an optional report generation module 1460, for generating reports. These reports can include lack of authorization reports, owner reports, automatic or according to requests, routine or custom, and so on.

As seen also above, the invention includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art.

A person skilled in the art of programming may use these descriptions to readily generate specific instructions for implementing a program according to the present invention.

An economy is achieved in the present document in that a single set of flowcharts is used to describe methods in and of themselves, along with operations of hardware and/or software. This is regardless of how each element is implemented.

Additional methods are now described according to embodiments.

Figure 15:
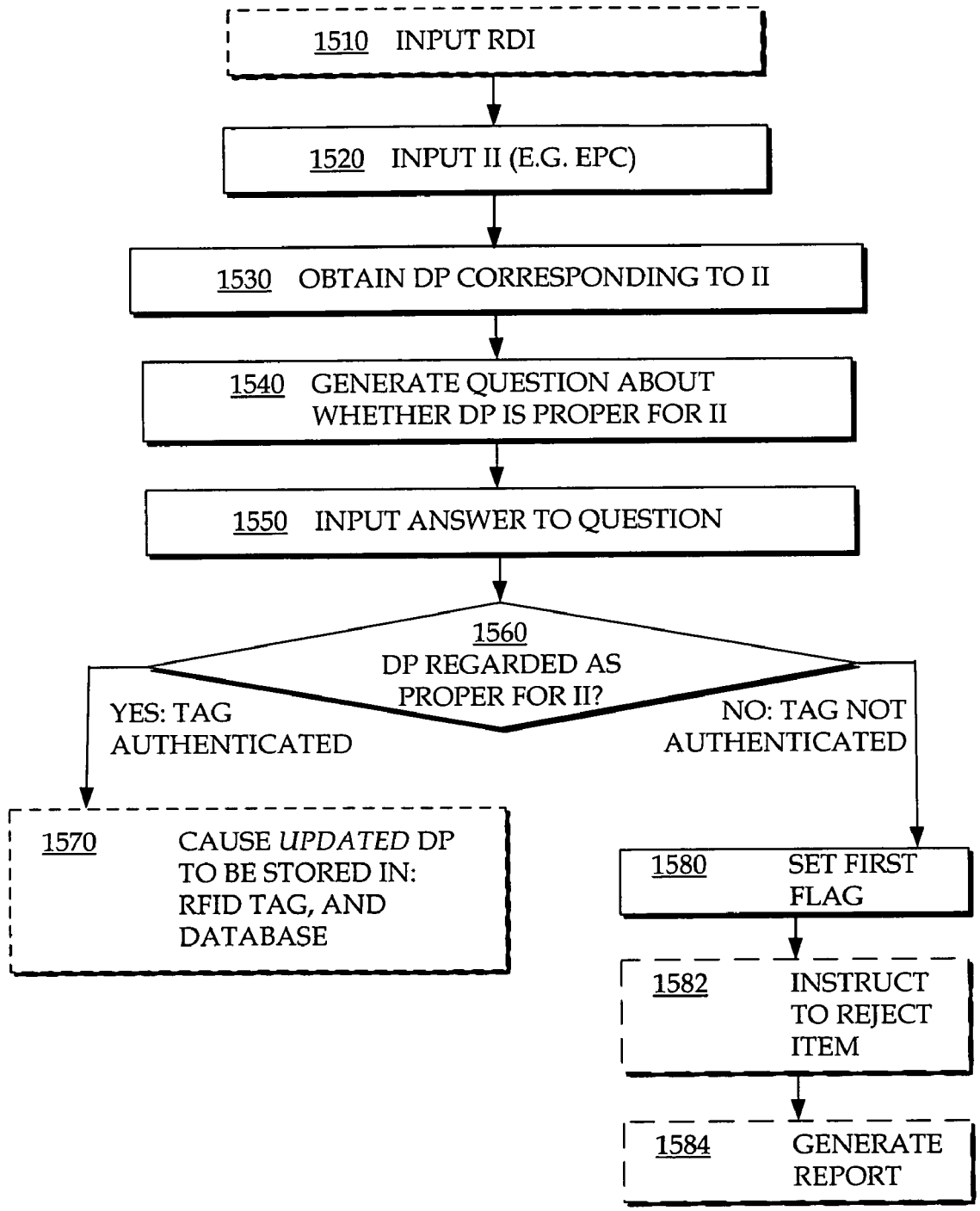
FIG. 15 is a flowchart illustrating methods to determine an authentication of RFID tags according to embodiments, for indicating a legitimacy of their associated items.

FIG. 15 is a flowchart 1500, illustrating methods to determine an authentication of RFID tags according to embodiments. Once the authentication is determined, it will indicate a legitimacy of proffered items associated with these RFID tags. The methods of flowchart 1500 may also be practiced by different embodiments of the invention described in this document. They can also be practiced by reader 810, by hub 875, by a combination of them, and so on. Data that is input as per the below, e.g. RDI, II, DP, can come from RFID tag 420 read by reader 810, or from an offeror of item 525, or a combination of both, and so on.

At optional operation 1510, a Reference Database Identifier (RDI) is input. It can be the only RDI, or a first one, with a second RDI being inputted later. The RDI is input in any number of ways, such as described elsewhere in this document.

The RDI is data, as described above, which is used for identifying the reference database that will be relevant for the method of flowchart 1500. In some embodiments, the reference database is local, such as when it is locally controlled, or has been formed with data received from a remote reference database, which could have permissions, etc.

In other embodiments, the reference database is accessible from an electronic communications network, and the input RDI to be used to locate the reference database in the network. For example, it can include a network address, or contact information for an operator of the database.

At another operation 1520, a first Item Identifier (II) is input from one or more RFID tags associated with an item. The first II is input in any number of ways, such as described elsewhere in this document.

At another next operation 1530, a first Declared Password (DP) is obtained from the one or more RFID tags, which corresponds to the first II. The first DP is input in any number of ways, such as described elsewhere in this document.

At optional next operation 1540, a question is generated about whether the first DP is regarded as proper or not for the first II. The question is generated in any number of ways, which substantially involve correlating the first DP and the first II. In some instances, instead of the first DP, the question can use a second DP that is findable from the first DP by applying a DP rule. In some instances, instead of the first II, the question can use a second II that is findable from the first II by applying an II rule.

The question is then applied to data of a reference database, and an answer is generated in response to such applying. The reference database can be the one identified by the RDI, if one has been input.

At next operation 1550, the answer to the question is input. As per the above, the answer is preferably as to whether the first DP is regarded as proper or not for the first II.

At optional next operation 1560, it is determined from the answer whether the first DP is regarded as proper or not for the first II.

If the answer indicates that the first DP is regarded as proper for the first II, then the tag is considered authenticated. Accordingly, the proffered item can be considered legitimate, and advance along the supply chain. Indicators can be triggered, such as a green light at the location of the tagged proffered item, and so on.

At an optional next operation 1570, an updated DP is input, and caused to be stored in the reference database, and also in the tag, in lieu of the previous DP. Such will help thwart counterfeiting efforts, as will be described later.

The updated DP can be generated in any number of ways. It can be generated as part of the method, or inputted externally, such as from the reference database. It can be generated from an event, like a time stamp, or at least a portion of it can be generated at random. If at random, then it can be checked whether, by some small chance, the at-random actually has a default value that entails a preset custom meaning for the reference database, which should be otherwise avoided for a DP. If that is the case, one more DP can be generated and used, and so on.

If the answer indicates that the first DP is regarded as not proper for the first II, then the tag is not considered authenticated. Accordingly, the proffered item can be considered illegitimate, and be rejected from the supply chain. For example, at a next operation 1580, a flag can be set, which would not be set if the answer indicated that the first DP is regarded as proper for the first II. The flag can be set in software, middleware, hardware, and trigger other actions, such as visible or audible indicators.

Setting the flag can have a number of results. For example, a flashing red light can be triggered by the flag. According to an optional operation 1582, an instruction can be generated to reject the proffered item. According to another next operation 1584, a lack of authentication report can be generated, and transmitted as per the above.

Figure 16:
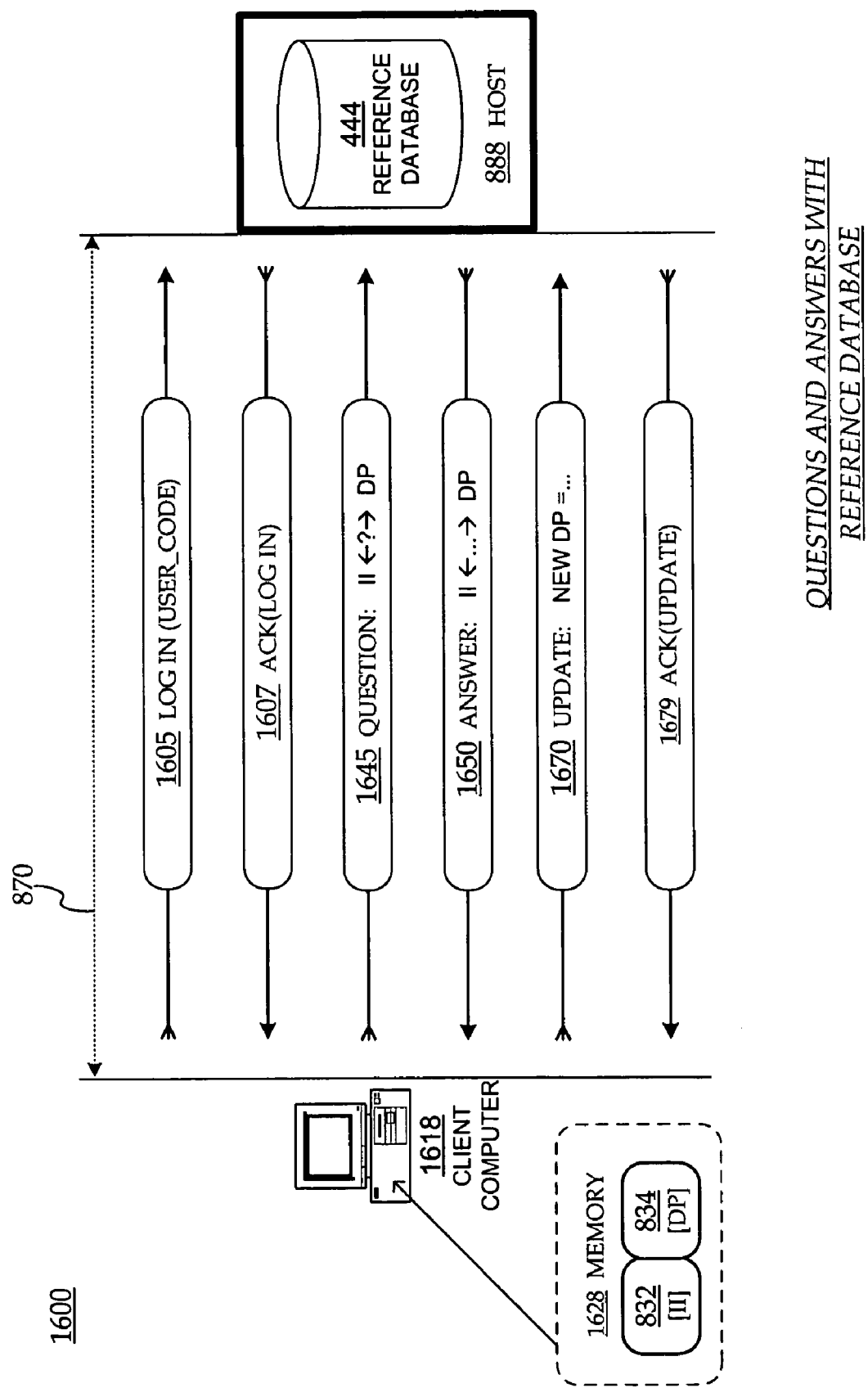
FIG. 16 is a diagram showing individual communications according to embodiments for performing a method such as that of FIG. 15, the communications being encoded in question signals and answer signals transmitted across a connection such as that of FIG. 8.

FIG. 16 is a diagram 1600 showing individual communications according to embodiments for performing a method such as that of FIG. 15. In this case, the question can be transmitted over an electronic communications network along link 870 for being applied to reference database 444, accessible via host 888. On the client's side, a client computer 1618 can be implemented within link 310, as part of reader 810, or hub 875, or both, depending on what is desired. Computer 1618 has a memory 1628 that inputs data 832 II and data 834 DP from reader 810.

Reference database 444 can be accessible via host 888 in a number of ways. In some such ways, no prior authorization or permission is needed by client computer 1618 to receive the answer to the question. In other instances, the reference database is accessible such that the answer is transmitted only subject to REF permissions being cleared, as has been described above. This is most easily enforceable when a party transmitting the question does not have full control of data of reference database 444, as host 888 is implemented separately. Often these permissions require that a user code be transmitted to the host in connection with transmitting the question.

The communications between client computer 1618 and host 888 are encoded in question signals QS and answer signals AS. Sample such communications are described, where the operator of client computer 1618 is considered the user.

According to a communication 1605, the user logs in to the host. Logging in can also be performed at a time when the user transmits the user code. Prior to logging in, the user will probably need to register with host 888, such as in database 1430 of FIG. 14.

According to a communication 1607, communication 1605 is acknowledged. Such acknowledging is often designated as "ACK". In preferred embodiments, acknowledging 1607 happens in conjunction with permissions being confirmed according to the user code, and prior to generating answers.

According to a communication 1645, the user transmits a question as to whether a specific DP is regarded as proper for a specific II, according to reference database 444. The question is intended to be applied to reference database 444.

In some embodiments, prior to applying the question, the user needs to obtain additional review privileges from a previous party. Only when these are granted from the previous party will the question be applied to the reference database. This feature is useful when custody of the RFID tagged items changes. Moreover, upon being granted such privileges, the prior party might lose some privileges, e.g. by the user denying them to the prior party. And equally, when the user is done, they might grant such review privileges to the next party for applying the question to reference database 444, and so on.

According to a communication 1650, an answer is transmitted to the question of communication 1645. It will be recognized that communication 1650 is input by client computer 1618 according to operation 1550 of method 1500.

According to a communication 1670, the user transmits an update, which includes a new DP that is to be regarded as proper by reference database 444 for the II just investigated. It will be recognized that the update of communication 1670 is the same as in operation 1570 of method 1500.

If this takes place according to permissions, then the update of communication 1670 is permitted only if the answer of communication 1650 was yes. As will be described later in this document, such updates effectively cut off the prior party from knowing any more of a DP than is regarded as proper for the II of the tag, and thus from being able to update the DP.

According to a communication 1679, communication 1670 is acknowledged. Then communications can take place for authenticating data of another tag, and so on.

Many other actions are also possible. For example, the DP can be caused to no longer be stored as regarded as proper for the II. This can be, for example, by a delete command. Such can happen from a link in the supply chain beyond which authentication is no longer desired or beneficial. Deletion can also save in fees if host 888 charges by how long data is retained.

Alternately, records in reference database 444 may expire on their own, either by agreement, or by planning, or by allocated customer credit. In this instance, a deadline can be determining after which the DP will no longer be confirmable as regarded as proper for the II by reference database 444. If needed, an action can be taken to extend the deadline. The deadline can be determined in any number of ways, such as from the first DP.

Figure 17:
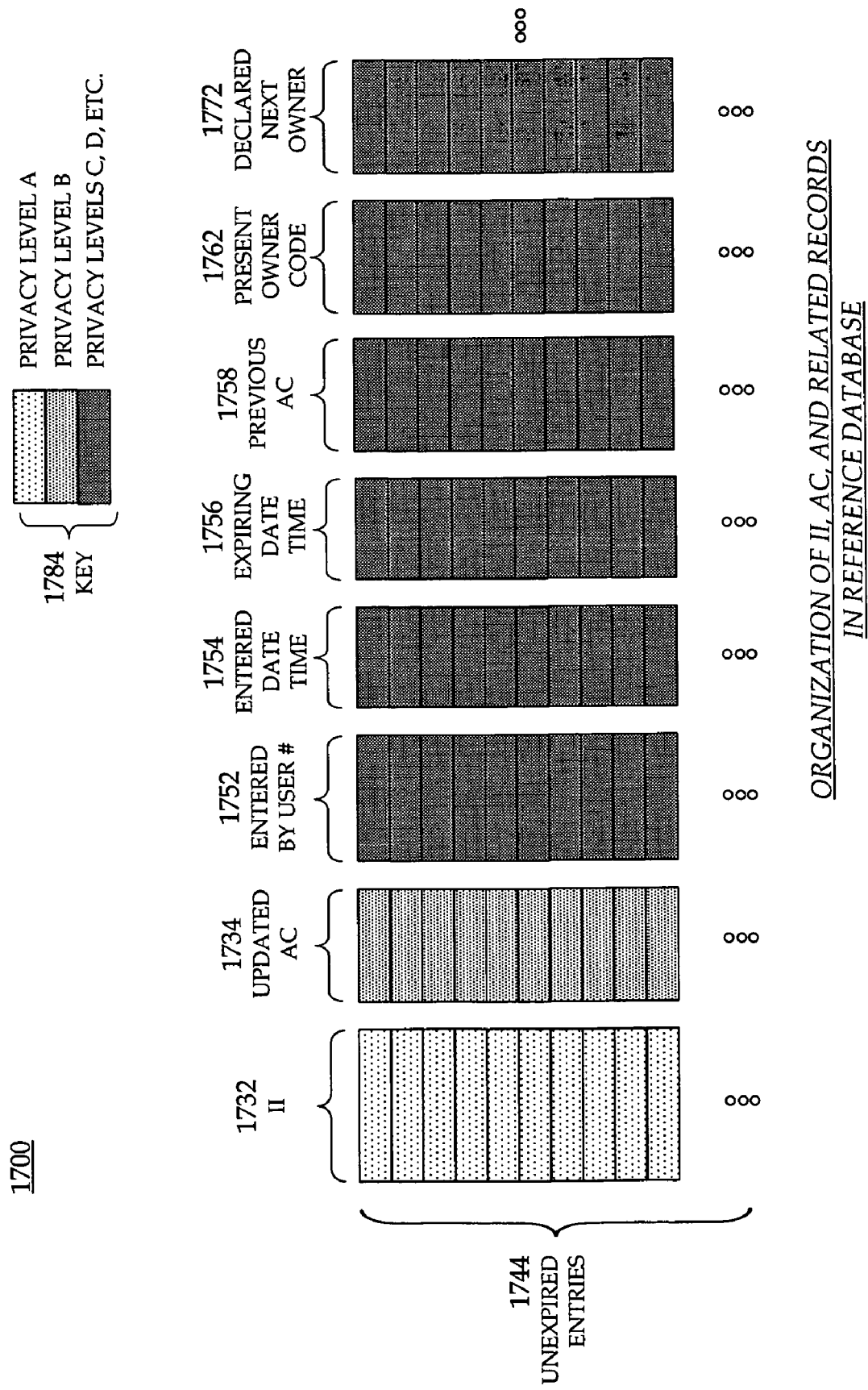
FIG. 17 is a diagram showing how data can be organized in a reference database according to embodiments.

FIG. 17 is a diagram 1700 showing how data can be organized in a reference database according to embodiments. Rows 1744 represent records, which in diagram represent unexpired entries. Not every possible II or EPC would be stored as a record, but only those requested by at least one of the links.

The records show different fields along columns. Column 1732 can be the Item Identifier (II), for which a proprietary or well known number can be used. In some embodiments, the Electronic Product Code (EPC) can be used for the II.

Column 1734 can hold the value of a last updated Associated Code AC, a code thus associated with the corresponding II of column 1732. The AC is like the good password, which the legitimate tag also uses as its Declared Password. The question becomes, given any RFID tag, is its DP the same as the AC?

For the II whose authorization is being checked, the inputted DP is tested for whether it matches the AC that is associated with the II. Matching can be for DP equaling AC exactly, or be different according to a translation rule, and so on. According to some embodiments of the REF permissions, it is the AC that is not given out to a user, unless they first demonstrate they know it, or they know a DP that is related to it by the translation rule.

Only one column 1734 is shown. If the DP must equal the AC exactly to pronounce a match, it means, there is only one AC that the reference database regards as proper for the II. Also that there is only one DP that the user can enter to authenticate the II. This is preferred as it increases the robustness of the protection, but not necessary. In fact, the system can be defined so that more than one DPs can be used to authenticate the II, either by both matching a single AC, or by matching more than one ACs defined for the II.

Figure 18:
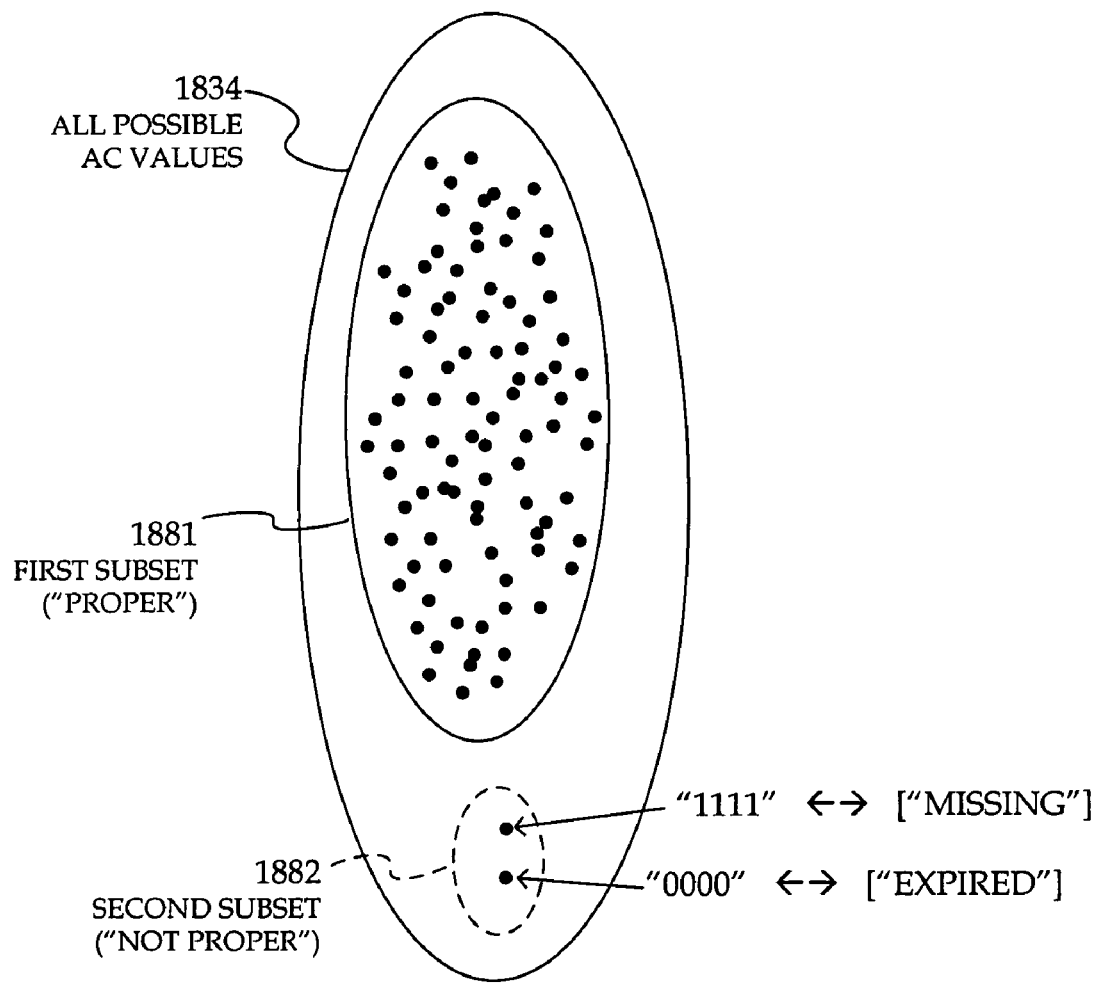
FIG. 18 is a diagram showing subsets of possible values of Associated Codes in the database of FIG. 17 according to embodiments.

Referring briefly to FIG. 18, an optional use of field 1734 is now described. All possible AC values are shown in set 1834. In a first embodiment, any such value can be regarded as proper for an II by the reference database.

In a second embodiment, set 1834 is split into a first subset 1881 and a second subset 1882. Any AC value in first subset 1881 can be regarded as proper for an II by the reference database. The AC values in second subset 1882, however, cannot be regarded as proper for an II, according to some definitions.

Second subset 1882 is thus taken out of set 1834 to reserve useful values that can serve as default, and be associated with special meanings. For example, if the ACs are 4 bits long, value 0000 can be reserved to designate that the association has recently expired, but could be revived if a fee is paid. For another example, value 1111 can be reserved to designate that a previous owner has designated this item missing. Of course, other default values and designations are possible, as may be requested.

Second subset 1882 is thus properly regarded as optional. If second subset 1882 is provided with at least one such reserved default value, the second embodiment will result. Alternately, if second subset 1882 is the null set, i.e. having no values, the first embodiment results, where all AC values can be regarded as proper.

Of course, when updated new DP values are assigned, care should be taken that they do not by chance be those of second subset 1882. These new DP values, from the point of view of the reference database are new AC values. When generated they should be checked; and if by any chance they have such a default value, another such value should be generated.

Returning now to FIG. 17, all the remaining fields are optional. It is in any event a good idea to maintain them for generating reports.

Column 1752 can hold the user name or user code of a user that entered this entry. Column 1754 can hold the date and the time that the entry of column 1752 was made. Column 1756 can hold the expiration date and time of a record.

Column 1758 can hold the previous AC of the record, before there was an update with the value in column 1734. Column 1762 can hold the present owner's user name or user code, which may be the party with the most privileges. In most embodiments, column 1762 is the same as column 1752. Column 1772 can hold the user name or user code of a declared next owner, such as someone being granted review privileges as per the above. Other fields are also possible.

It will be further observed that different fields include different privacy levels, which means that different ones of them can be revealed to different parties, under different circumstances, and in different manners. Many embodiments are possible, such as, for example, the REF permissions described above. In the example of FIG. 17, according to a key 1784, column 1734 with the IIs has a privacy level A, column 1734 with the ACs has a privacy level B, and all the other columns have different privacy levels C, D, etc. Privacy levels and REF permissions can also be enforced from the host.

Figure 19:
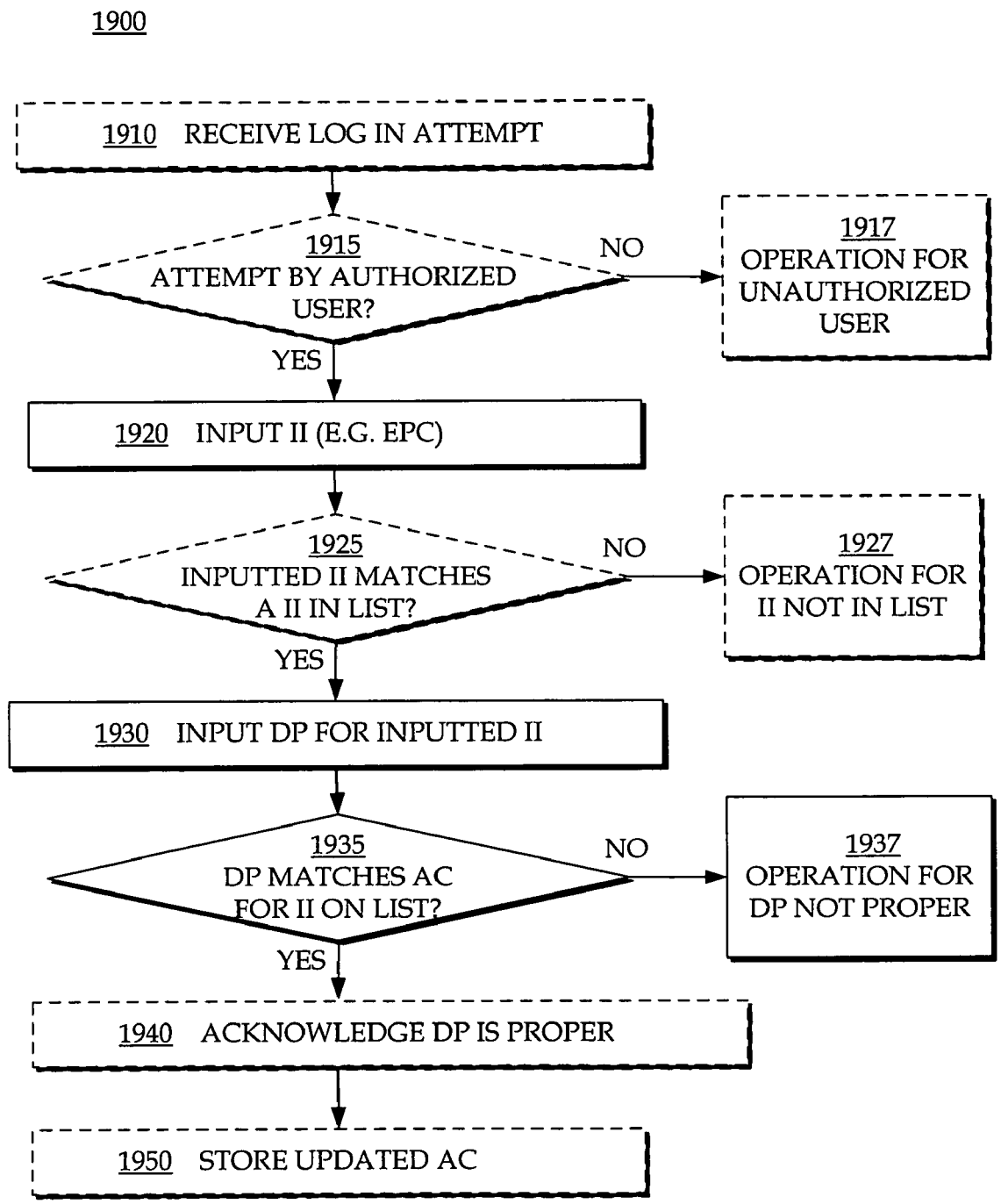
FIG. 19 is a flowchart illustrating methods according to embodiments to report on authentication of RFID tags, for indicating legitimacy of their associated items.

FIG. 19 is flowchart 1900 illustrating methods according to other embodiments of the invention to report on authentication of RFID tags. The methods of flowchart 1900 may also be practiced by different embodiments of the invention described in this document, such as host 888, an Authentication Service 1277, and so on.

It will be recognized that much of this description has many common aspects with what is already described above, which is why many such common aspects are not repeated for describing flowchart 1900. Plus, much of the description of flowchart 1900 also applies to aspects above. Also, many of the variations below can generate individual components of an answer that is transmitted.

At optional operation 1910, a log in attempt is received from a user, such as by receiving the above described communication 1605. The log in attempt is just one way for inputting user information, such as a user code.

At optional operation 1915, it can be verified whether the attempt of operation 1910 is from a legitimate user. This can be performed in a number of ways. For example, it can be verified that the user is within a list of users. In this or a prior step, the user preferably becomes registered with the list, by meeting the posed requirements and so on. If the user is unauthorized, then at a next optional operation 1917 a suitable operation is performed for the unauthorized user, such as rejecting the log in attempt, creating a report, transmitting an answer that informs of the status, and so on.

If the user is authorized, at next operation 1920, an Item Identifier (II) is input. As per the above, the II could be an EPC, etc. More strictly speaking, a first II is inputted from one or more RFID tags associated with an item, and a second II is inputted at operation 1920, which is derived by applying an II rule to the first II. As also per the above, the first II can be the same as the second II, but that is not necessary, as long as some rule is followed that correlates the second II with the first II.

At optional next operation 1925, it is inquired whether the II inputted at operation 1920 matches one of the IIs in a list of records, such as a list made from fields 1732. If not, then at a next optional operation 1927 a suitable operation is performed for the II not on the list, such as transmitting an answer that informs the user, generating and transmitting a lack of authentication report as per the above, and so on.

If there is a match at operation 1925, it generally identifies a third II that is stored in reference database 444, and matches the second II. To pronounce a match, the third II could be identical to the second II, or not, as long as some rule is followed that correlates the third II with the second II.

If the user is authorized, at next operation 1930, a Declared Password (DP) is input. More strictly speaking, a first DP is inputted from the one or more RFID tags associated with the item, and a second DP is inputted at operation 1930, which is derived by applying a DP rule to the first DP. As also per the above, the first DP can be the same as the second DP, but that is not necessary, as long as some rule is followed that correlates the second DP with the first DP.

Inputting the II at operation 1920 and the DP at operation 1930 is performed in a context of inputting a question as to whether the second DP is regarded as proper or not for the second II by reference database 444.

At next operation 1935, it is determined whether the DP inputted at operation 1930 matches an Associated Code (AC) that is stored in the reference database as being associated with the third II. This is if a value of the AC belongs in first subset 1881 of possible AC values. However, and as per the above, if the value belongs in second subset 1882, a mismatch can be pronounced without considering the DP. In fact, the answer can include a customized meaning associated with the value in second subset 1882, such as "MISSING" or "EXPIRED". This will not occur, of course, if second subset 1882 is the null set.

If there is a mismatch at operation 1935, then at a next optional operation 1937 a suitable operation is performed for the mismatched II, such as transmitting an answer that informs the user, creating a report, and so on.

In some embodiments, it is determined whether the DP has a value that belongs in second subset 1882 of possible AC values. If so, operation 1937 includes setting an intrusion flag, if it is deemed that this is a rogue attempt.

In some embodiments, operation 1937 includes incrementing a failure counter, which counts failed attempts. Since such failed attempts could be suspect, further operations can be controlled in terms of the failure counter. For example, the failure counter can be reset for the user or the II, if the inconsistency is resolved otherwise. For another example, if the failure counter exceeds a threshold, further actions can be taken, such as discontinuing generating answers, performing an intervention, and so on.

Before generating an answer to the question, a number of actions can take place. For example, permissions can be confirmed, such as according to the user information, and so on. In some instances, permissions can be updated, for example upon receiving a suitable request from another user, or granting privileges such as review privileges and so on.

Then an answer can be generated which is also responsive to the question, as to whether the DP is regarded as proper for the II. Briefly, it is regarded as proper if the DP matches the AC that is stored in the reference database as being associated with the II in the reference database, and the AC has an AC value that belongs in first subset 1881 of AC values that are regarded as proper. And the DP is not regarded as proper if the second DP does not match the AC value or if the AC value belongs in second subset 1882 of AC values that are regarded as not proper.

At next operation 1940, the answer is transmitted. The answer can be directed to any client computer that is requested. A default is to transmit the answer to the client computer from which the II is inputted.

It should be appreciated that, when the answer is transmitted, it causes answer signal AS to reproduce in a client computer an answer. The same applies with all other communications of the type described in FIG. 16.

In some instances the answer is transmitted without the user needing to clear any permissions. In some instances the answer is transmitted only subject to REF permissions being cleared.

Figure 20:
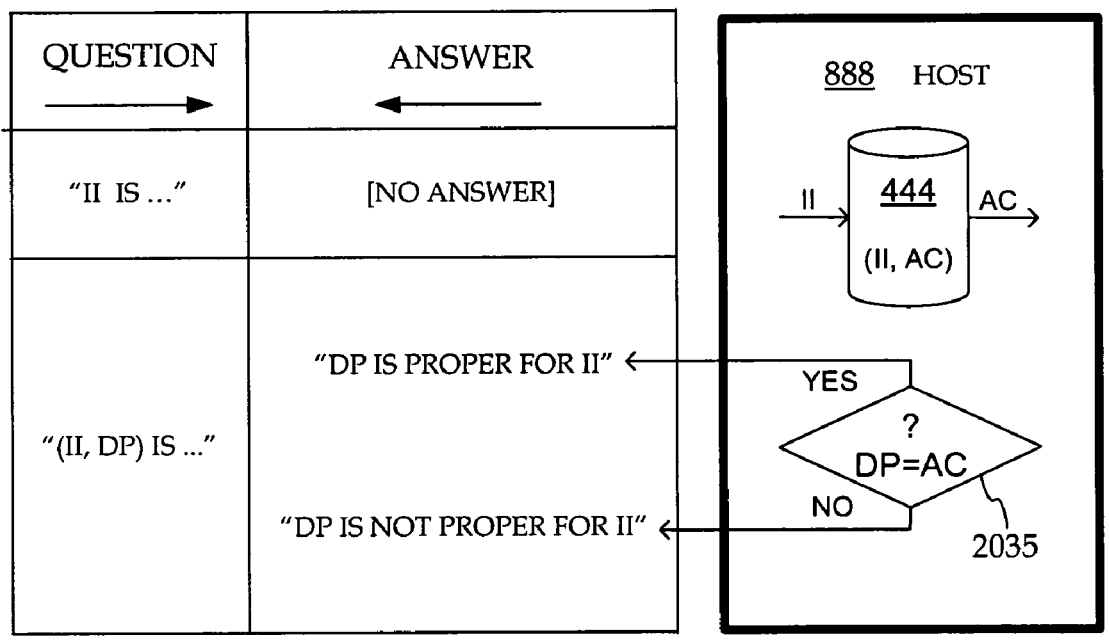
FIG. 20 is a conceptual diagram for illustrating that a host of a reference database does not reveal an Associated Code, except if it is first demonstrated that a valid DP is already known.

Referring to FIG. 20, a conceptual diagram 2000 illustrates that host 888 of reference database 444 does not reveal an Associated Code (AC), except if it is first demonstrated that a valid DP is already known for an II, according to embodiments of the REF permissions. A table shows possible questions and their answers.

The first question that reveals only the II receives no answer. Within host 888, a received II can be used with reference database 444 to determine the AC associated with the inputted II. But the AC itself is not reported out in response to the first question. Or it could be revealed, but then immediately changed, so what was revealed is no longer valid.

The second question furnishes the II of interest, along with the Declared Password DP. Within host 888, a decision box 2035 determines whether the DP is equal to the AC. If not, the answer reports that, without revealing the AC. If yes, the user has demonstrated first that they know the AC, by having inputted it as the DP.

The advantage of these REF permissions is now described.

Returning to FIG. 19, at optional next operation 1950, an updated AC is stored in the reference database in lieu of the former AC. The updated AC can be inputted externally or generated and transmitted to the user. At least a portion of it can be generated at random, but then it can be checked to ensure it does not have a value within the second subset; if it does, one more AC can be generated and used instead of the second AC.

Figure 21:
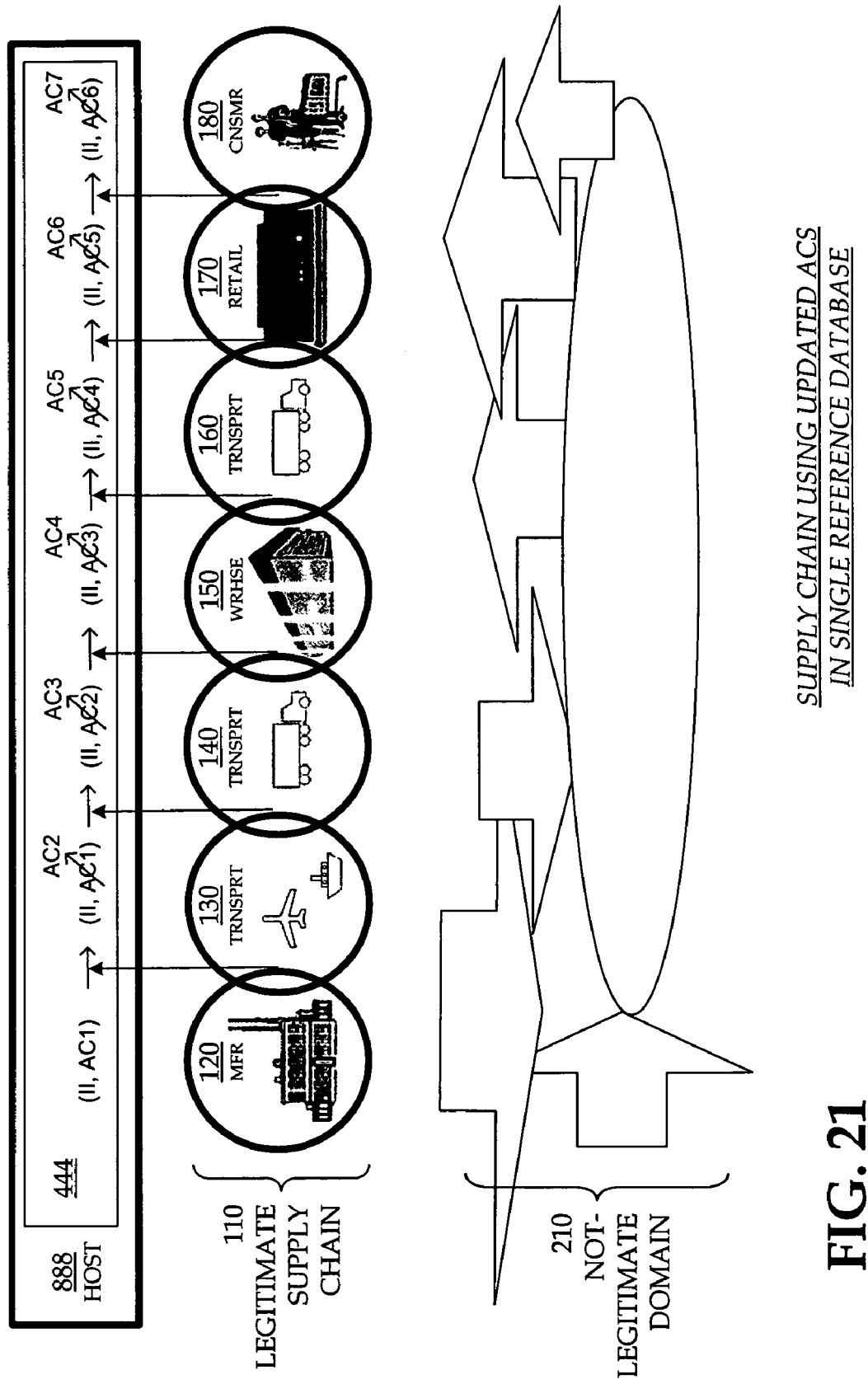
FIG. 21 is the conceptual drawing of FIG. 11, further showing how an Associated Code (AC) can be changed at different nodes of a legitimate supply chain, to frustrate the activities of an illegitimate domain.

Referring now to FIG. 21, a diagram 2100 shows the effects of updating, while using a single reference database. For a single Item Identifier (II), different nodes update the AC to different values, from AC1, to AC2, to AC3, to AC4, to AC5, to AC6, to AC7. Each time one link updates it, none of the other links can update it any more.

An indirect result is that the threat of RFID tag cloning is thwarted. If a legitimate RFID tag is procured, and its II and DP read, this data is useless. Any clones with the same data will not be accepted, once the DP of the legitimate item is updated.

Figure 22:
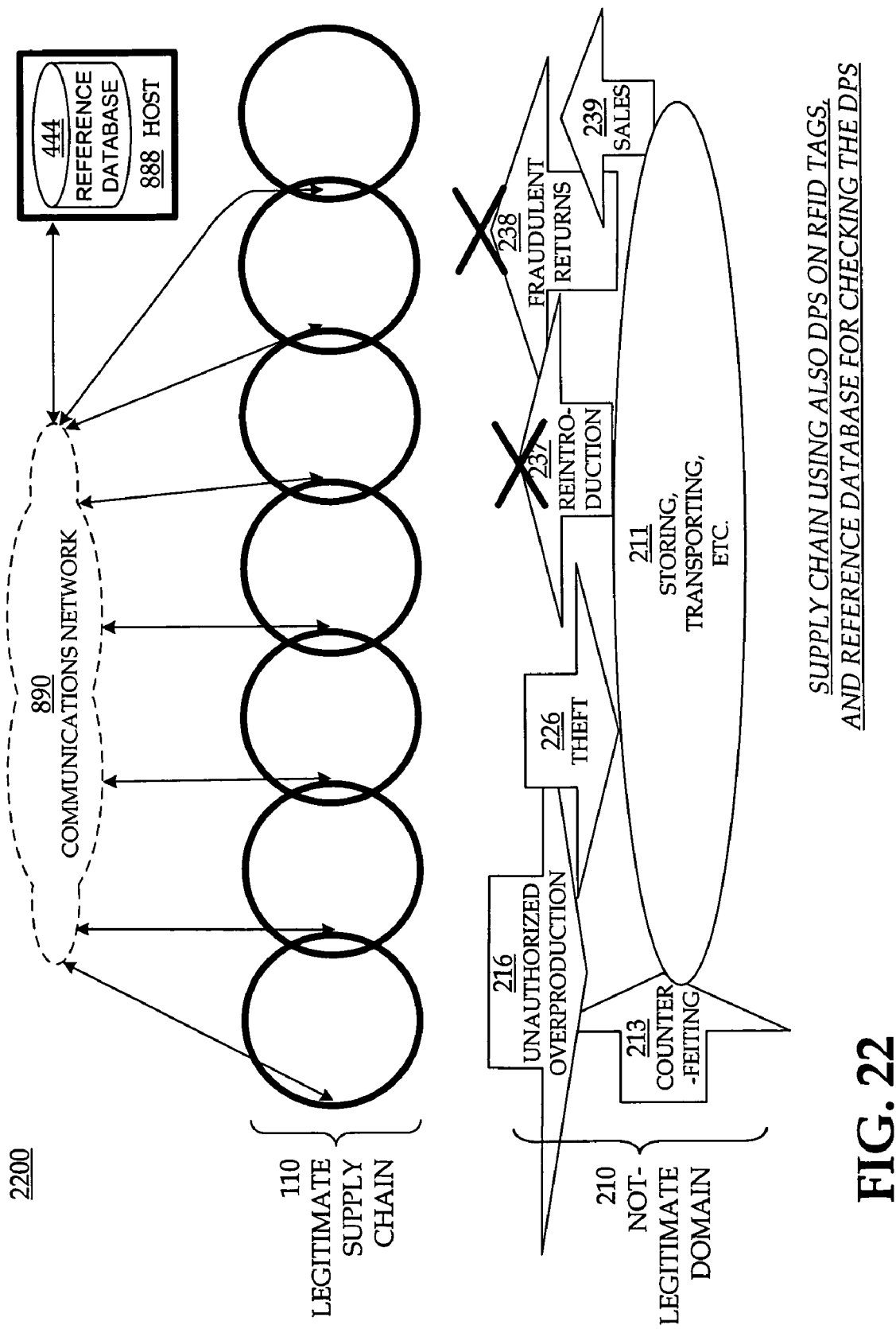
FIG. 22 is the diagram of FIG. 11, further showing an effect of using the invention.

Referring now to FIG. 22, the result can be appreciated. By demanding that RFID tags can be authenticated before moving on to the next link, the unauthorized items will be thwarted from entering at those links. More particularly, the invention prevents reintroduction activities 237 and fraudulent returns 238. When that happens, there is less incentive for counterfeiting 213, unauthorized overproduction 216 and theft 226.

There are many possible extensions of the invention. One group of embodiments has to do with deleting records from the reference database, for example as per a deletion request. Or letting them expire after a deadline, after which the answer is not transmitted. There can be a grace period, before which an expired entry can be revived, and after which the result would be different. Also a deadline can be extended and so on. The deadline can be encoded in the AC, and so on.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. Elements having been shown in one combination could appear also in another.

The following claims define certain combinations and subcombinations, which are regarded as novel and non-obvious. Additional claims for other combinations and subcombinations of features, functions, elements and/or properties may be presented in this or a related document.

What is claimed is:

1. A computer comprising: a processor and a storage medium coupled with the processor, the storage medium having instructions stored thereon which, when executed by the processor, result in:

the processor deriving a second Item Identifier (II) by applying an II rule to a first II that the processor has received from one or more Radio Frequency Identification (RFID) tags associated with an item;

the processor matching a third II stored in a reference database to the second II;

the processor deriving a second Declared Password (DP) by applying a DP rule to a first DP that the processor has received from the one or more RFID tags in a context of the processor receiving a question as to whether the first DP is regarded as proper or not for the first II;

the processor generating an answer responsive to the question, the answer including that the first DP is regarded as proper for the first II if the second DP matches a first Associated Code (AC) stored in the reference database and associated with the third II, and the first AC has an AC value that belongs in a first subset of values that are regarded as proper for the third II, and not proper if the second DP does not match the AC or if the AC value belongs in a second subset of values that are regarded as not proper for the third II; and the processor transmitting the answer.

2. The computer of claim 1, in which the second subset is the null set.

3. The computer of claim 1, in which the first AC is the only AC in the reference database that is regarded as proper for the third II.

4. The computer of claim 1, in which at least a portion of the first II includes a designation about the item assigned according to a proprietary scheme of assigning identifying numbers.

5. The computer of claim 1, in which the first II includes at least a portion of a code assigned according to a scheme known to the public of assigning identifying numbers.

6. The computer of claim 1, in which the first II includes at least a portion of an Electronic Product Code (EPC).

7. The computer of claim 1, in which the first DP is a binary code at least 8 bits long.

8. The computer of claim 1, in which at least a portion of the first DP has been generated by a random process.

9. The computer of claim 1, in which at least a portion of the first DP designates another action pertaining to the item.

10. The computer of claim 1, in which the second II is identical to the first II.

11. The computer of claim 1, in which the third II is identical to the second II.

12. The computer of claim 1, in which the third II is correlated to but not identical to the second II.

13. The computer of claim 1, in which the second DP is identical to the first DP.

14. The computer of claim 1, in which executing the instructions further results in:

the processor determining whether the second DP has a value that belongs in the second subset of possible AC values; and if so, setting an intrusion flag.

15. The computer of claim 1, in which executing the instructions further results in:

if the first DP is not regarded as proper for the first II, the processor incrementing a failure counter.

16. The computer of claim 15, in which executing the instructions further results in:

the processor resetting the failure counter.

17. The computer of claim 15, in which executing the instructions further results in:

if the failure counter exceeds a threshold, discontinuing generating answers.

18. The computer of claim 15, in which executing the instructions further results in:
if the failure counter exceeds a threshold, performing an intervention.

19. The computer of claim 1, in which
the first II is received from a first client computer, and
the answer is transmitted to the first client computer.

20. The computer of claim 1, in which
the answer includes that there is no identified third II stored in the reference database that matches the second II.

21. The computer of claim 1, in which
the answer is transmitted without a party needing to clear any permissions to receive the answer.

22. The computer of claim 1, in which
the answer is transmitted only subject to REF ('reference database') permissions being cleared, the REF permissions including that an AC that is regarded as proper for the third II is not revealed in the answer unless the question first demonstrates that a DP that is regarded as proper for the third II is already known.

23. The computer of claim 22, in which
the REF permissions include that a DP that previously could be determined as regarded as proper for the third II can be revealed in the answer.

24. The computer of claim 1, in which executing the instructions further results in:
the processor receiving user information in connection with receiving the first II, and
in which the answer is transmitted to a user according to the user information.

25. The computer of claim 24, in which executing the instructions further results in:
the processor verifying that the user is within a list of approved users.

26. The computer of claim 24, in which executing the instructions further results in:
the processor registering the user in a list of users.

27. The computer of claim 24, in which executing the instructions further results in:
the processor confirming permissions according to the user information prior to generating the answer.

28. The computer of claim 27, in which executing the instructions further results in:
the processor updating permissions associated with the user information responsive to receiving a request from another user.

29. The computer of claim 1, in which executing the instructions further results in:
the processor determining whether or not the first DP is regarded as proper for the first II for generating the answer.

30. The computer of claim 29, in which
the second DP matches the first AC if it is identical to it.

31. The computer of claim 29, in which
the second DP matches the first AC if it is correlated to it but not identical to it.

32. The computer of claim 29, in which executing the instructions further results in:
if the first DP is not regarded as proper for the first II, further generating a lack of authentication report.

33. The computer of claim 32, in which
the lack of authentication report includes at least one of a time, a date, the second II, and the second DP.

34. The computer of claim 32, in which executing the instructions further results in:
the processor transmitting the lack of authentication report to a monitoring party.

35. The computer of claim 29, in which
if the first DP is not regarded as proper for the first II because the first AC has an AC value belonging in the second subset, then the answer includes a customized meaning associated with the default value.

36. The computer of claim 35, in which
the customized meaning is that an item to which the one or more RFID tags are attached has been declared missing by a prior owner of it.

37. The computer of claim 35, in which
the customized meaning is that retention of a record for the third II in the reference database has expired.

38. The computer of claim 29, in which executing the instructions further results in:
if the first DP is regarded as proper for the first II, the processor storing a second AC in the reference database that is regarded as proper for the third II in lieu of the first AC.

39. The computer of claim 38, in which executing the instructions further results in:
the processor receiving the second AC.

40. The computer of claim 38, in which executing the instructions further results in:
the processor generating the second AC.

41. The computer of claim 40, in which
at least a portion of the second AC is generated at random.

42. The computer of claim 41, in which
the at-random generated portion of the second AC is further checked to ensure it does not have a value within the second subset, and if it does, generating a third AC and using it instead of the second AC.

43. The computer of claim 1, in which executing the instructions further results in:
the processor causing the first AC to no longer be proper for the third II in the reference database.

44. The computer of claim 43, in which
the first AC is caused to no longer be proper for the third II responsive to receiving a deletion request.

45. The computer of claim 1, in which
the third II and the first AC are stored in the reference database in conjunction with a deadline, and
the answer is not transmitted if the deadline has passed.

46. The computer of claim 45, in which executing the instructions further results in:
extending the deadline.

47. The computer of claim 45, in which
the deadline is determined from the first AC.

48. A method, comprising:
deriving a second Item Identifier (II) by applying an II rule to a first II that a processor has received from one or more Radio Frequency Identification (RFID) tags associated with an item;
matching a third II stored in a reference database to the second II by the processor;
deriving a second Declared Password (DP) by applying a DP rule to a first DP that the processor has received from the one or more RFID tags in a context of receiving a question as to whether the first DP is regarded as proper or not for the first II;
generating an answer responsive to the question by the processor, the answer including that the first DP is regarded as proper for the first II if the second DP matches a first Associated Code (AC) stored in the reference database and associated with the third II, and the first AC has an AC value that belongs in a first subset of values that are regarded as proper for the third II, and not proper if the second DP does not match the AC or if the AC value belongs in a second subset of values that are regarded as not proper for the third II; and
transmitting the answer by the processor.

49. The method of claim 48, in which
the second subset is the null set.

50. The method of claim 48, in which
the first AC is the only AC in the reference database that is regarded as proper for the third II.

51. The method of claim 48, in which
at least a portion of the first II includes a designation about the item assigned according to a proprietary scheme of assigning identifying numbers.

52. The method of claim 48, in which
the first II includes at least a portion of a code assigned according to a scheme known to the public of assigning identifying numbers.

53. The method of claim 48, in which
the first II includes at least a portion of an Electronic Product Code (EPC).

54. The method of claim 48, in which
the first DP is a binary code at least 8 bits long.

55. The method of claim 48, in which
at least a portion of the first DP has been generated by a random process.

56. The method of claim 48, in which
at least a portion of the first DP designates another action pertaining to the item.

57. The method of claim 48, in which
the second II is identical to the first II.

58. The method of claim 48, in which
the third II is identical to the second II.

59. The method of claim 48, in which
the third II is correlated to but not identical to the second II.

60. The method of claim 48, in which
the second DP is identical to the first DP.

61. The method of claim 48, further comprising:
determining by the processor whether the second DP has a value that belongs in the second subset of possible AC values; and
if so, setting an intrusion flag.

62. The method of claim 48, further comprising:
if the first DP is not regarded as proper for the first II, incrementing by the processor a failure counter.

63. The method of claim 62, further comprising:
resetting the failure counter by the processor.

64. The method of claim 62, further comprising:
if the failure counter exceeds a threshold, discontinuing generating answers by the processor.

65. The method of claim 62, further comprising:
if the failure counter exceeds a threshold, performing an intervention by the processor.

66. The method of claim 48, in which
the first II is received from a first client computer, and the answer is transmitted to the first client computer.

67. The method of claim 48, in which
the answer includes that there is no identified third II stored in the reference database that matches the second II.

68. The method of claim 48, in which
the answer is transmitted without a party needing to clear any permissions to receive the answer.

69. The method of claim 48, in which
the answer is transmitted only subject to REF ('reference database') permissions being cleared, the REF permissions including that an AC that is regarded as proper for the third II is not revealed in the answer unless the question first demonstrates that a DP that is regarded as proper for the third II is already known.

70. The method of claim 69, in which
the REF permissions include that a DP that previously could be determined as regarded as proper for the third II can be revealed in the answer.

71. The method of claim 48, further comprising:
receiving user information in connection with receiving the first II by the processor, and
in which the answer is transmitted to a user according to the user information.

72. The method of claim 71, further comprising:
verifying that the user is within a list of approved users by the processor.

73. The method of claim 71, further comprising:
registering the user in a list of users by the processor.

74. The method of claim 71, further comprising:
confirming permissions according to the user information prior to generating the answer by the processor.

75. The method of claim 74, further comprising:
updating permissions associated with the user information responsive to receiving a request from another user by the processor.

76. The method of claim 48, further comprising:
determining whether or not the first DP is regarded as proper for the first II for generating the answer.

77. The method of claim 76, in which
the second DP matches the first AC if it is identical to it.

78. The method of claim 76, in which
the second DP matches the first AC if it is correlated to it but not identical to it.

79. The method of claim 76, further comprising:
if the first DP is not regarded as proper for the first II, further generating a lack of authentication report.

80. The method of claim 79, in which
the lack of authentication report includes at least one of a time, a date, the second II, and the second DP.

81. The method of claim 79, further comprising:
transmitting the lack of authentication report to a monitoring party by the processor.

82. The method of claim 76, in which
if the first DP is not regarded as proper for the first II because the first AC has an AC value belonging in the second subset, then the answer includes a customized meaning associated with the default value.

83. The method of claim 82, in which
the customized meaning is that an item to which the one or more RFID tags are attached has been declared missing by a prior owner of it.

84. The method of claim 82, in which
the customized meaning is that retention of a record for the third II in the reference database has expired.

85. The method of claim 76, further comprising:
if the first DP is regarded as proper for the first II, storing by the processor a second AC in the reference database that is regarded as proper for the third II in lieu of the first AC.

86. The method of claim 85, further comprising:
receiving the second AC.

87. The method of claim 85, further comprising:
generating the second AC by the processor.

88. The method of claim 87, in which
at least a portion of the second AC is generated at random.

89. The method of claim 88, in which
the at-random generated portion of the second AC is further checked to ensure it does not have a value within the second subset, and if it does, generating a third AC and using it instead of the second AC.

90. The method of claim 48, further comprising:
causing the first AC to no longer be proper for the third II in the reference database.

91. The method of claim 90, in which
the first AC is caused to no longer be proper for the third II responsive to receiving a deletion request.

92. The method of claim 48, in which
the third II and the first AC are stored in the reference database in conjunction with a deadline, and
the answer is not transmitted if the deadline has passed.

93. The method of claim 92, further comprising:
extending the deadline.

94. The method of claim 92, in which
the deadline is determined from the first AC.

95. A method, comprising:
causing, in response to receiving a question signal from a client computer, an answer signal to be produced in a host system about whether a first Declared Password (DP) is regarded as proper or not for a first Item Identifier (II),
in which
a second II is derived by a processor of the host system applying an II rule to the first II the processor has received from one or more Radio Frequency Identification (RFID) tags associated with an item,
the second II is matched against a third II stored in a reference database;
a second DP is derived by the processor of the host system applying a DP rule to first DP the processor has received from the one or more RFID tags, and
the answer signal includes that the first DP is regarded as proper for the first II if the second DP matches a first Associated Code (AC) stored in the reference database associated with the third II, and the first AC has an AC value that belongs in a first subset of values that are regarded as proper for the third II, and not proper if the second DP does not match the AC or if the AC value belongs in a second subset of values that are regarded as not proper for the third II.

96. The method of claim 95, in which
the second subset is the null set.

97. The method of claim 95, in which
the first AC is the only AC in the reference database that is regarded as proper for the third II.

98. The method of claim 95, in which
at least a portion of the first II includes a designation about the item assigned according to a proprietary scheme of assigning identifying numbers.

99. The method of claim 95, in which
the first II includes at least a portion of a code assigned according to a scheme known to the public of assigning identifying numbers.

100. The method of claim 95, in which
the first II includes at least a portion of an Electronic Product Code (EPC).

101. The method of claim 95, in which
the first DP is a binary code at least 8 bits long.

102. The method of claim 95, in which
the second DP is identical to the first DP.

103. The method of claim 95, in which
at least a portion of the first DP has been generated by a random process.

104. The method of claim 95, in which
at least a portion of the first DP designates another action pertaining to the item.

105. The method of claim 95, in which
the second II is identical to the first II.

106. The method of claim 95, in which
the third II is identical to the second II.

107. The method of claim 95, in which
the third II is correlated to but not identical to the second II.

108. The method of claim 95, in which
it is further determined whether the second DP has a value that belongs in the second subset of possible AC values; and
if so, setting an intrusion flag.

109. The method of claim 95, in which
the answer signal includes that there is no identified third II stored in the reference database that matches the second II.

110. The method of claim 95, in which
the question signal is received by the host system without confirming whether the client computer belongs to a client with any permissions.

111. The method of claim 95, in which
the question signal is received by the host system only after confirming the client computer belongs to a client with appropriate permissions.

112. The method of claim 95, in which
the question signal is received by the host system only after confirming the client computer belongs to a client that clears REF ('reference database') permissions, the REF permissions including that an AC that is regarded as proper for the third II is not revealed in the answer signal unless the question first demonstrates that a DP that is regarded as proper for the third II is already known.

113. The method of claim 112, in which
the REF permissions include that a DP that previously could be regarded as proper for the third II can be revealed in the answer signal.

114. The method of claim 95, in which
the question signal is received by the host system only after confirming that the client computer belongs to a client within a prestored list.

115. The method of claim 114, further comprising:
confirming permissions for the client prior to generating the answer signal.

116. The method of claim 115, further comprising:
updating permissions associated with the client responsive to receiving a request from an other user.

117. The method of claim 95, in which
the second DP matches the first AC if it is identical to it.

118. The method of claim 95, in which
the second DP matches the first AC if it is correlated to it but not identical to it.

119. The method of claim 95, further comprising:
if the first DP is not regarded as proper for the first II, causing to be generated a lack of authentication report.

120. The method of claim 119, in which
the lack of authentication report includes at least one of a time, a date, the second II, and the second DP.

121. The method of claim 119, further comprising:
causing a report signal to produce the lack of authentication report in a monitoring party's client computer.

122. The method of claim 95, in which
if the first DP is not regarded as proper for the first II because the first AC has a default value belonging in the second subset, then the answer signal further includes a customized meaning associated with the default value.

123. The method of claim 122, in which
the customized meaning is that an item to which the one or more RFID tags are attached has been declared missing by a prior owner of it.

124. The method of claim 122, in which
the customized meaning is that retention of a record for the third II in the reference database has expired.

125. The method of claim 95, further comprising:
causing an update acknowledgment signal to produce in a second client computer a confirmation that a second AC has been stored in lieu of the first AC in the reference database as being regarded as proper for the third II.

126. The method of claim 125, in which
the client computer is the same as the second client computer.

127. The method of claim 125, in which
the second AC has been learned from a transmission of one of the client computer and the second client computer.

128. The method of claim 125, further comprising:
causing an update data signal to produce in one of the client computer and the second client computer the second AC.

129. The method of claim 128, in which
the second AC has been generated at random at least in part.

130. The method of claim 128, in which
the second AC has been generated responsive to having received the question signal.

131. The method of claim 95, further comprising:
if the first DP is regarded as proper for the first II, causing an updated first DP to be stored in one of: the reference database and the one or more RFID tags.

* * * * *

UNITED STATES PATENT AND TRADEMARK OFFICE
CERTIFICATE OF CORRECTION

PATENT NO. : 7,633,376 B2　　　　　　　　　　　　　　　　　　　　　　　Page 1 of 1
APPLICATION NO. : 11/637255
DATED : December 15, 2009
INVENTOR(S) : Diorio et al.

It is certified that error appears in the above-identified patent and that said Letters Patent is hereby corrected as shown below:

1) Please delete "date, the second II," in claim 33, column 25, line 65 of the specification, and insert --date, the first II, the second II, the first DP,-- therefore.

2) Please delete "date, the second II," in claim 80, column 28, line 37 of the specification, and insert --date, the first II, the second II, the first DP,-- therefore.

3) Please delete "II" in claim 95, column 29, line 23 of the specification, and insert --II-- therefore.

4) Please delete "date, the second II," in claim 120, column 30, line 55 of the specification, and insert --date, the first II, the second II, the first DP,-- therefore.

Signed and Sealed this

Sixteenth Day of March, 2010

David J. Kappos
*Director of the United States Patent and Trademark Office*